US008246227B2

(12) United States Patent
Okubo et al.

(10) Patent No.: US 8,246,227 B2
(45) **Date of Patent: *Aug. 21, 2012**

(54) VEHICLE HEADLAMP

(75) Inventors: Yasuhiro Okubo, Isehara (JP); Toshiya Abe, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 359 days.

This patent is subject to a terminal disclaimer.

(21) Appl. No.: 12/648,915

(22) Filed: Dec. 29, 2009

(65) Prior Publication Data

US 2010/0194276 A1 Aug. 5, 2010

(30) Foreign Application Priority Data

Jan. 30, 2009 (JP) ................................ 2009-019848

(51) Int. Cl.
*F21V 7/16* (2006.01)
*B60Q 1/06* (2006.01)

(52) U.S. Cl. ......................... 362/514; 362/517; 362/281

(58) Field of Classification Search .................. 362/513, 362/514, 515, 517, 465, 281, 283
See application file for complete search history.

(56) References Cited

U.S. PATENT DOCUMENTS

RE15,088 E 4/1921 Schroeder
4,831,506 A * 5/1989 Miyazawa .................... 362/526
5,060,120 A 10/1991 Kobayashi et al.
5,086,376 A 2/1992 Blusseau
6,334,702 B1 1/2002 Albou
6,457,849 B2 10/2002 Tsukamoto
6,626,565 B2 9/2003 Ishida
7,108,412 B2 9/2006 Ishida et al.
7,311,430 B2 12/2007 Tsukamoto et al.
7,682,038 B2 3/2010 Wood
2004/0252517 A1 12/2004 Ishida et al.
2007/0086202 A1 4/2007 Tsukamoto et al.
2008/0089085 A1 4/2008 Popelek
2010/0110711 A1 5/2010 Ookubo
2010/0110714 A1 5/2010 Ookubo

FOREIGN PATENT DOCUMENTS

DE 38 26 988 A1 2/1990
DE 10 2004 012 184 A1 12/2004
EP 0 373 065 B1 6/1990
EP 1 225 387 B1 7/2002
FR 2 808 867 A1 11/2001
JP 2007-109493 A 4/2007

OTHER PUBLICATIONS

Y. Ookubo, U.S. PTO Office Action, U.S. Appl. No. 12/603,317, dated Dec. 7, 2011, 13 pages.
Y. Okubo, U.S. PTO Notice of Allowance, U.S. Appl. No. 12/603,317, dated Feb. 24, 2012, 8 pages.

* cited by examiner

*Primary Examiner* — Peggy A. Neils
(74) *Attorney, Agent, or Firm* — Foley & Lardner LLP

(57) ABSTRACT

A vehicle headlamp is provided with: a fixed reflector having reflecting surfaces made of parabola-based free curved faces; movable reflectors having reflecting surfaces made of parabola-based free curved faces; and semiconductor-type light sources having light emitting chips shaped like a planar rectangle. When the movable reflectors are positioned in a first location, a light distribution pattern for low beam is obtained. When the movable reflectors are positioned in a second location, light distribution patterns for high beams are obtained. When the movable reflectors are positioned in a third location, light distribution patterns for daytime running light are obtained. As a result, the vehicle headlamp can achieve downsizing, weight reduction, power saving, and cost reduction.

19 Claims, 18 Drawing Sheets

VEHICLE HEADLAMP

CROSS-REFERENCE TO RELATED APPLICATIONS

This application claims priority of Japanese Patent Application No. 2009-019848 filed on Jan. 30, 2009. The contents of this application are incorporated herein by reference in their entirety.

BACKGROUND OF THE INVENTION

1. Field of the Invention

The present invention relates to a vehicle headlamp for changing over and illuminating a light distribution pattern for low beam (light distribution pattern for passing), a light distribution pattern for high beam (light distribution pattern for cruising), and a light distribution pattern for daytime running light toward a forward direction of a vehicle.

2. Description of the Related Art

A vehicle headlamp of this type is conventionally known (Japanese Laid-open Patent Application No. 2007-109493). Hereinafter, the conventional vehicle headlamp will be described. The conventional vehicle headlamp is made up of: a first light source unit which forms a light distribution pattern for low beam; and a second light source unit which forms a light distribution pattern for high beam. The first light source unit is of a projector-type lamp unit, and is provided with a light source, an elliptical (convergent) reflector, a shade, and a projecting lens. In addition, the second light source unit is a projector-type lamp unit, and is made up of a light source, an elliptical (convergent) reflector, and a projecting lens. Hereinafter, functions of the conventional vehicle headlamp will be described. When a light source of the first light source unit is lit, light from the light source is reflected by means of the reflector; a part of the reflected light is cut off by means of the shade; a light distribution pattern having an oblique cutoff line and a horizontal cutoff line, i.e., a light distribution pattern for low beam is formed; and the light distribution pattern for low beam is longitudinally or transversely inverted from the projecting lens, and is illuminated (projected) toward the forward direction of the vehicle. In addition, when a light source of the second light source unit is lit, light from the light source is reflected by means of the reflector, and the reflected light is longitudinally or transversely inverted from the projecting lens, as a light distribution pattern for high beam, and is illuminated (projected) toward the forward direction of the vehicle.

Again, the conventional vehicle headlamp is made up of: the first light source unit having the light source, the reflector, the shade, and the projector lens; and the second light source unit having the light source, the reflector, and the projecting lens. Thus, the conventional vehicle headlamp requires a large number of components and requires the second light source unit for high-beam light distribution pattern, entailing a problem concerning downsizing, weight reduction, power saving, or cost reduction, accordingly. In addition, in order to obtain a light distribution pattern for daytime running light, the conventional vehicle headlamp requires a third light source unit having a light source, a reflector, a shade, and a projecting lens, in addition to the first and second light source units. Therefore, in order to obtain the light distribution pattern for daytime running light, the conventional vehicle headlamp further entails problems concerning downsizing, weight reduction, power saving, and cost reduction.

The present invention has been made in order to solve the above-described problem concerning downsizing, weight reduction, power saving, or cost reduction, which could arise due to a reason that the conventional vehicle headlamp requires the second light source unit for high-beam light distribution pattern.

SUMMARY OF THE INVENTION

A first aspect of the present invention is directed to a vehicle headlamp, comprising:

(i) a fixed reflector having a reflecting surface made of a parabola-based free curved face;

(ii) a movable reflector having a reflecting surface made of a parabola-based free curved face;

(iii) a semiconductor-type light source having a light emitting chip;

(iv) a holder by which the movable reflector is rotatably mounted around a horizontal axis passing through a center of the light emitting chip or proximity thereof; and (v) a drive unit for rotating the movable reflector around the horizontal axis among a first location, a second location, and a third location, wherein:

a reference focal point of the reflecting surface of the fixed reflector and a reference focal point of the reflecting surface of the movable reflector are coincident or substantially coincident with each other and positioned at the center of the light chip or proximity thereof;

a reference focal axis of the reflecting surface of the fixed reflector and a reference focal axis of the reflecting surface of the movable reflector are coincident or substantially coincident with each other and are orthogonal to the horizontal axis, and further pass through the center of the light emitting chip or proximity thereof;

an area of the reflecting surface of the fixed reflector is greater than an area of the reflecting surface of the movable reflector;

a reference focal point distance of the reflecting surface of the fixed reflector is greater than a reference focal point distance of the reflecting surface of the movable reflector;

the reflecting surface of the fixed reflector is comprised of: a reflecting surface for low beam, forming a light distribution pattern for low beam; and a reflecting surface for high beam and daytime running light, forming a light distribution pattern for high beam or a light distribution pattern for daytime running light;

the reflecting surface of the movable reflector is comprised of a reflecting surface for high beam and daytime running light, forming the light distribution pattern for high beam or the light distribution pattern for daytime running light;

when the movable reflector is positioned in the first location, light which is radiated from the light emitting chip onto the reflecting surface for high beam and daytime running light, of the fixed reflector, or reflection light reflected on the reflecting surface for high beam and daytime running light, of the fixed reflector, is shaded by means of the movable reflector, and reflection light reflected on the reflecting surface for low beam, of the fixed reflector, is illuminated toward a forward direction of a vehicle, as the light distribution pattern for low beam;

when the movable reflector is positioned in the second location, reflection light reflected on the reflecting surface for high beam and daytime running light, of the movable reflector; reflection light reflected on the reflecting surface for high beam and daytime running light, of the fixed reflector; and reflection light reflected on the reflecting surface for low beam, of the fixed reflector, respectively, are illuminated toward the forward direction of the vehicle, as the light distribution pattern for high beams; and when the movable reflector is positioned in the third location, reflection light reflected on the reflecting surface for high beam and daytime running light, of the movable reflector; reflection light reflected on the reflecting surface for high beam and daytime running light, of the fixed reflector; and reflection light reflected on the reflecting surface for low beam, of the fixed reflector, respectively, are illuminated toward the forward direction of the vehicle, as the light distribution pattern for daytime running light.

A second aspect of the present invention is directed to the vehicle headlamp according to the first aspect, wherein:

the light distribution pattern for low beam is a light distribution pattern having an oblique cutoff line on a cruising lane side and a horizontal cutoff line on an opposite lane side while an elbow point is employed as a boundary;

the light emitting chip is shaped like a planar rectangle;

a light emission face of the light emitting chip is oriented in a vertical-axis direction which is orthogonal to the reference optical axis and the horizontal axis;

a long side of the light emitting chip is parallel to the horizontal axis;

the reflecting surface for low beam is comprised of a first reflecting surface and a second reflecting surface, of a center portion, and a third reflecting surface of an end portion, which are divided into the vertical-axis direction;

the first reflecting surface is a reflecting surface made of a free curved face for light-distributing and controlling a reflection image of the light emitting chip so that: the reflection image of the light emitting chip is disallowed to come out of the oblique cutoff line and the horizontal cutoff line; and a part of the reflection image of the light emitting chip is substantially in contact with the oblique cutoff line and the horizontal cutoff line;

the second reflecting surface is a reflecting surface made of a free curved face for light-distributing and controlling the reflection image of the light emitting chip, so that: the reflection image of the light emitting chip is disallowed to come out of the oblique cutoff line and the horizontal cutoff line and a part of the reflection image of the light emitting chip is substantially in contact with the oblique cutoff line and the horizontal cutoff line; and density of a reflection image group of the light emitting chip becomes lower than density of a reflection image group of the light emitting chip according to the first reflecting surface and the reflection image group of the light emitting chip contains the reflection image group of the light emitting chip according to the first reflecting surface; and the third reflecting surface is a reflection surface made of a free curved face for light-distributing and controlling the light emitting chip so that: the reflection image of the light emitting chip is substantially included in the light distribution pattern; the density of the reflection image group of the light emitting chip becomes lower than the density of the reflection image group of the light emitting chip according to the first reflecting surface and the second reflecting surface; and the reflection image group of the light emitting chip contains the reflection image group of the light emitting chip according to the first reflection surface and the second reflecting surface.

A third aspect of the present invention is directed to the vehicle headlamp according to the first aspect, wherein:

the fixed reflector is substantially shaped like a rotational parabola face;

a size of an opening of the fixed reflector is about 120 mm or less in diameter, and is greater than a size of an opening of the movable reflector when the movable reflector is positioned in the second location and the third location;

a reference focal point of the reflecting surface of the fixed reflector is on the reference optical axis and is positioned between a center of the light emitting chip and a long side at a backside of the light emitting chip;

a reference focal point distance of the reflecting surface of the fixed reflector is about 10 to 18 mm, and is greater than a reference focal point distance of the reflecting surface of the movable reflector; and the first reflecting surface and the second reflecting surface are provided in a range in which a longitudinal angle from the center of the light emitting chip is within about ±40 degrees, the range being equivalent to a range in which a reflection image of which an inclination relative to the screen horizontal line of the reflection image of the light emitting chip is within an angle obtained by adding about 5 degrees to an inclination angle of the oblique cutoff line is obtained, and in a range of high energy in the energy distribution of the light emitting chip.

A fourth aspect of the present invention is directed to the vehicle headlamp according to the first aspect, wherein:

the reflecting surface of the fixed reflector, the reflecting surface of the movable reflector, and the semiconductor-type light source are disposed so that an upside unit in which the light emission face of the light emitting chip is oriented upward in a vertical-axis direction is point-symmetrical to a downside unit in which the emission face of light emitting chip is oriented downward in the vertical-axis direction.

A fifth aspect of the present invention is directed to the vehicle headlamp according to the first aspect, comprising a dimming control portion for dimming the light which is radiated from the light emitting chip of the semiconductor-type light source, when the movable reflector is positioned in the third location, with respect to the light which is radiated from the light emitting chip of the semiconductor-type light source when the movable reflector is positioned in the first location or the second location.

A sixth aspect of the present invention is directed to a vehicle headlamp, comprising:

(i) a semiconductor-type light source for illuminating light;

(ii) a first reflector of a parabola-based curved face, having a plurality of reflecting surfaces including a first reflecting surface for light distribution pattern and a second reflecting surface for light distribution pattern, for reflecting light which is radiated from the semiconductor-type light source as reflection light to thereby illuminate the reflected light to a forward direction of a vehicle;

(iii) a second reflector which is movable to a plurality of locations, having the second reflecting surface for light distribution pattern, the second reflector shading the reflected light according to the first reflecting surface for light distribution pattern and changing over a light distribution pattern according to the shaded reflecting surface;

(iv) a drive unit for moving the second reflector to the plurality of locations and changing over the first light distribution pattern, the second light distribution pattern, and a third light distribution pattern according to the moved position, wherein:

the second reflector is constituted to be movable between:

a first location in which the second reflecting surface for light distribution pattern, of the second reflector, is disposed in opposite to the second reflecting surface for light distribution pattern, of the first reflector;

a second location in which the second reflecting surface for light distribution pattern, of the second reflector, is disposed in front of the first reflecting surface for light distribution pattern, of the first reflector;

a third location in which the second reflecting surface for light distribution pattern, of the second reflector, while the second reflector is inclined at a predetermined angle from the second location, is disposed in front of the first reflecting surface for light distribution pattern, of the first reflector;

when the second reflector is disposed in the first location, reflection light reflected on the second reflecting surface for light distribution pattern, of the first reflector, is shaded by means of the second reflecting surface for light distribution pattern, of the second reflector, and reflection light reflected on the first reflecting surface for light distribution pattern, of the first reflector, is illuminated toward the forward direction of the vehicle, as the first light distribution pattern;

when the second reflector is disposed in the second location, the reflection light reflected on the first reflecting surface for light distribution pattern, of the first reflector, is shaded by means of the second reflecting surface for light distribution pattern, of the second reflector, and a respective one of reflection light beams reflected on the second reflecting surface for light distribution pattern, of the first reflector, and on the second reflecting surface for light distribution pattern, of the second reflector, is illuminated to the forward direction of the vehicle, as the second light distribution pattern; and when the second reflector is disposed in the third location, the reflection light reflected on the first reflecting surface for light distribution pattern, of the first reflector, is shaded by means of the second reflecting surface for light distribution pattern, of the second reflector, while the second reflector is inclined at a predetermined angle from the second location, and a respective one of the reflection light beams reflected on the second reflecting surface for light distribution pattern, of the first reflector, and on the second reflecting surface for light distribution pattern, of the second reflector, while the second reflector is inclined at the predetermined angle from the second location, is illuminated toward the forward direction of the vehicle, as the third light distribution pattern.

A seventh aspect of the present invention is directed to the vehicle headlamp according to the sixth aspect, further comprising a dimming control portion which is electrically connected to the semiconductor-type light source, for reducing a duty ratio of a pulse width supplied from a power source against time axis, thereby dimming a quantity of light which is radiated from the semiconductor-type light source, wherein:

the dimming control portion controls the semiconductor-type light source so that: a light quantity of the semiconductor-type light source when the second reflector is disposed in the third location is smaller than a light quantity of the semiconductor-type light source when the second reflector is positioned in the first location and the second location.

An eighth aspect of the present invention is directed to the vehicle headlamp according to the sixth aspect, wherein:

the first reflecting surface for light distribution pattern, of the first reflector, is a reflecting surface forming reflection light of a light distribution pattern for low beam, having a cutoff line, which is the first light distribution pattern; and the second reflecting surface for light distribution pattern, of the first reflector, is a reflecting surface forming reflection light of a light distribution pattern for high beam, which is the second light distribution pattern or a light distribution pattern for daytime running light, which is the third light distribution pattern.

A ninth aspect of the present invention is directed to the vehicle headlamp according to the sixth aspect, wherein:

the second location of the second reflector is determined by turning the second reflector at a first angle from the first location by means of the drive unit; and the third location of the second reflector is determined by turning the second reflector at an angle less than or more than the first angle from the first location.

A tenth aspect of the present invention is directed to the vehicle headlamp according to the sixth aspect, wherein:

the second location of the second reflector is determined by turning the second reflector at 90 degrees from the first location by means of the drive unit; and the third location of the second reflector is determined by turning the second reflector at 85 degrees or 105 degrees from the first location by means of the drive unit.

An eleventh aspect of the present invention is directed to the vehicle headlamp according to the sixth aspect, wherein:

the second reflector has a through hole for passing the reflection light according to the second reflecting surface for light distribution pattern, of the first reflector, toward the forward direction of the vehicle, in the second location and the third location.

A twelfth aspect of the present invention is directed to the vehicle headlamp according to the sixth aspect, wherein:

the second reflector has a visor portion which is provided at a peripheral rim of the second reflector so as to shade direct light from the semiconductor-type light source in the first location.

A thirteenth aspect of the present invention is directed to the vehicle headlamp according to the sixth aspect, wherein:

the second reflecting surface for light distribution pattern, of the second reflector, is disposed in opposite to a part of the first reflecting surface for light distribution pattern, of the first reflector, in the second location and the third location;

when the second reflector is disposed in the second location and the third location, a part of the reflection light reflected on the first reflecting surface of the first reflector is shaded by means of the second reflecting surface for light distribution pattern, of the first reflector; and a respective one of reflection light beams reflected on: the second reflecting surface for light distribution pattern, of the first reflector; the second reflecting surface for light distribution pattern, of the second reflector; and a portion other than said part of the first reflecting surface for light distribution pattern, of the first reflector, is illuminated toward the forward direction of the vehicle.

A fourteenth aspect of the present invention is directed to the vehicle headlamp according to the sixth aspect, further comprising a holder for fixing and holding the semiconductor-type light source and the first reflector so as to reflect the light which is radiated from the light emission face of the semiconductor-type light source in a vertical-axis direction by the first reflector, as reflection light, and illuminate the reflected light toward the forward direction of the vehicle, wherein:

the holder is adapted to rotatably mount the second reflector among the first location, the second location, and the third location, according to changeover by the drive unit.

A fifteenth aspect of the present invention is directed to the vehicle headlamp according to the sixth aspect, wherein:

the first reflecting surface for light distribution pattern, of the first reflector, includes:

a first reflecting surface and a second reflecting surface which are adjacent to a center of the first reflector and arranged in a range of high energy in an energy distribution of the semiconductor-type light source; and a third reflecting surface which is arranged on each end of the first reflector so as to sandwich the first reflecting surface and the second reflecting surface therebetween, and is arranged in a range of low energy in the energy distribution of the semiconductor-type light source; and the second reflecting surface for light distribution pattern, of the first reflector, is provided at a part of the first reflecting surface and the second reflecting surface of the first reflecting surface for light distribution pattern, of the first reflector.

A sixteenth aspect of the present invention is directed to the vehicle headlamp according to the fifteenth aspect, wherein:

the first reflecting surface and the second reflecting surface, of the first reflecting surface for light distribution pattern, of the first reflector, are provided in a range in which a reflection image of the semiconductor-type light source is obtained within a longitudinal angle of about ±40 degrees from a center in a vertical-axis direction of the light emission face of the semiconductor-type light source.

A seventeenth aspect of the present invention is directed to the vehicle headlamp according to the sixth aspect, wherein:

the light distribution pattern for low beam, which is the first light distribution pattern, is a light distribution pattern having an oblique cutoff line on a cruising lane side and a horizontal cutoff line on an opposite lane side while an elbow point is employed as a boundary;

the semiconductor-type light source has a light emitting chip;

the light emitting chip is shaped like a planar rectangle;

a light emission face of the light emitting chip is oriented in a vertical-axis direction which is orthogonal to the reference optical axis and the horizontal axis;

a long side of the light emitting chip is parallel to the horizontal axis;

the reflecting surface for low beam which is the first reflecting surface for light distribution pattern is comprised of a first reflecting surface and a second reflecting surface, of a center portion, and a third reflecting surface of an end portion, which are divided into the vertical-axis direction;

the first reflecting surface is a reflecting surface made of a free curved face for light-distributing and controlling a reflection image of the light emitting chip so that: the reflection image of the light emitting chip is disallowed to come out of the oblique cutoff line and the horizontal cutoff line; and a part of the reflection image of the light emitting chip is substantially in contact with the oblique cutoff line and the horizontal cutoff line; and the second reflecting surface is a reflecting surface made of a free curved face for light-distributing and controlling the reflection image of the light emitting chip so that: the reflection image of the light emitting chip is disallowed to come out of the oblique cutoff line and the horizontal cutoff line and a part of the reflection image of the light emitting chip is substantially in contact with the oblique cutoff line and the horizontal cutoff line; and density of a reflection image group of the light emitting chip becomes lower than density of a reflection image group of the light emitting chip according to the first reflecting surface and the reflection image group of the light emitting chip contains the reflection image group of the light emitting chip according to the first reflecting surface; and the third reflecting surface is a reflection surface made of a free curved face for light-distributing and controlling the light emitting chip so that: the reflection image of the light emitting chip is substantially included in the light distribution pattern; the density of the reflection image group of the light emitting chip becomes lower than the density of the reflection image group of the light emitting chip according to the first reflecting surface and the second reflecting surface; and the reflection image group of the light emitting chip contains the reflection image group of the light emitting chip according to the first reflection surface and the second reflecting surface.

An eighteenth aspect of the present invention is directed to the vehicle headlamp according to the sixth aspect, wherein:

the fixed reflector is substantially shaped like a rotational parabola face;

a size of an opening of the fixed reflector is about 120 mm or less in diameter, and is greater than a size of an opening of the movable reflector when the movable reflector is positioned in the second location and the third location;

a reference focal point of the reflecting surface of the fixed reflector is on the reference optical axis and is positioned between a center of the light emitting chip and a long side at a backside of the light emitting chip;

a reference focal point distance of the reflecting surface of the fixed reflector is about 10 to 18 mm, and is greater than a reference focal point distance of the reflecting surface of the movable reflector; and the first reflecting surface and the second reflecting surface are provided in a range in which a longitudinal angle from the center of the light emitting chip is within about ±40 degrees, the range being equivalent to a range in which a reflection image of which an inclination relative to the screen horizontal line of the reflection image of the light emitting chip is within an angle obtained by adding about 5 degrees to an inclination angle of the oblique cutoff line is obtained, and in a range of high energy in the energy distribution of the light emitting chip.

A nineteenth aspect of the present invention is directed to the vehicle headlamp according to the sixth aspect, wherein:

the reflecting surface of the fixed reflector, the reflecting surface of the movable reflector, and the semiconductor-type light source are disposed so that an upside unit having the light emission face of the light emitting chip oriented upward in a vertical-axis direction is point-symmetrical to a downside unit having the emission face of light emitting chip oriented downward in the vertical-axis direction.

In the vehicle headlamp according to the first aspect of the present invention, by means for solving the above-described problem, when a movable reflector is positioned in a first location, if a light emitting chip of a semiconductor-type light source is lit to emit light, the light which is radiated from the light emitting chip is reflected on a reflecting surface for low beam, of a fixed reflector, and the reflected light is illuminated toward a forward direction of a vehicle, as a light distribution pattern for low beam. In addition, when the movable reflector is positioned in a second location, if the light emitting chip of the semiconductor-type light source is lit to emit light, the light which is radiated from the light emitting chip is reflected on: a reflecting surface for high beam and daytime running light, of the movable reflector; a reflecting surface for high beam and daytime running light, of the fixed reflector, and a reflecting surface for low beam, respectively, and the reflected light beams are illuminated toward the forward direction of the vehicle, as light distribution patterns for high beams, respectively. Further, when the movable reflector is positioned in a third location, if the light emitting chip of the semiconductor-type light source is lit to emit light, the light which is radiated from the light emitting chip is reflected on: a reflecting surface for high beam and daytime running light, of the movable reflector; a reflecting surface for high beam and daytime running light, of the fixed reflector; and a reflecting surface for low beam, respectively, and the reflected light beams are illuminated toward the forward direction of the vehicle, as light distribution patterns for daytime running light, respectively.

Moreover, the vehicle headlamp according to the first aspect of the present invention is made of: the fixed reflector; the upside and downside movable reflectors; the upside and downside semiconductor-type light sources; and the drive unit, so that: in comparison with the conventional vehicle headlamp, a need is eliminated for: a second light source unit for a light distribution pattern for high beam; and a third light unit for a light distribution pattern for daytime running light; the number of components is reduced; and downsizing, weight reduction, or cost reduction can be achieved accordingly.

In addition, in the vehicle headlamp according to the second aspect of the present invention, by means for solving the above-described problem, when a movable reflector is positioned in a first location, if a light emitting chip of a semiconductor-type light source is lit to emit light, the light which is radiated from the light emitting chip is reflected on a reflecting surface for low beam, of a fixed reflector, and a light distribution pattern for low beam, having an oblique cutoff line on a cruising lane side and having a horizontal cutoff line on an opposite lane side, while an elbow point is employed as a boundary, is illuminated toward the forward direction of the vehicle. In other words, a reflection image of a light emitting chip, which is reflected on a first reflecting surface, is illuminated toward the forward direction of the vehicle so that the image is disallowed to come out of the oblique cutoff line and the horizontal cutoff line; and a part of the reflection image of the light emitting chip is substantially in contact with the oblique cutoff line and the horizontal cutoff line. In addition, the reflection image of the light emitting chip, which is reflected on the second reflecting surface, is illuminated toward the forward direction of the vehicle, so that: the image is disallowed to come out of the oblique cutoff line and the horizontal cutoff line; a part of the reflection image of the light emitting chip is substantially in contact with the oblique cutoff line and the horizontal cutoff line; and the density of a reflection image group of the light emitting chip becomes lower than that of a reflection image group of the light emitting chip according to the first reflecting surface. Further, the reflection image of the light emitting chip, which is reflected on the third reflecting surface, is illuminated toward the forward direction of the vehicle so that: the image is substantially included in a light distribution pattern for low beam; and the density of the reflection image group of the light emitting chip becomes lower than that of the reflection image group of the light emitting chip according to the first and second reflecting surfaces. In this way, according to the vehicle headlamp to the second aspect of the present invention, a high luminous intensity zone near the oblique cutoff line on the cruising lane side and the horizontal cutoff line on the opposite lane side, of the light distribution pattern for low beam, is controlled to be light-distributed on the first reflecting surface, so that it contribute to a traffic safety by improving a long-distance visibility and disallowing a stray light to the oncoming vehicles or pedestrians. Further according to the vehicle headlamp of the second aspect of the present invention, a middle luminous intensity zone controlled to be light-distributed on the second reflecting surface includes a high luminous intensity zone near the oblique cutoff line on the cruising lane side and the horizontal cutoff line on the opposite lane side, of the light distribution pattern for low beam, which is controlled to be light distributed on the first reflecting surface, so that the high luminous intensity zone near the oblique cutoff line on the cruising lane side and the horizontal cutoff line on the opposite lane side, of the light distribution pattern for low beam, which is controlled to be light distributed on the first reflecting surface, is connected to a low luminous intensity zone of the entire light distribution pattern for low beam, which is controlled to be light-distributed on the third reflecting surface, in the middle luminous intensity zone near the oblique cutoff line on the cruising lane side and the horizontal cutoff line on the opposite lane side, of the light distribution pattern for low beam, which is controlled on the second reflecting surface to achieve a smooth variation of luminous intensity. As a result, the vehicle headlamp according to the second aspect of the present invention becomes capable of light-distributing and controlling a light distribution pattern for low beam, having an oblique cutoff line and a horizontal cutoff line, the pattern being optimal for use in vehicle.

In addition, in the vehicle headlamp according to the second aspect of the present invention, a relationship between the numbers of constituent light sources and optical elements is obtained as a relationship (1:1) between one set of the constituent semiconductor-type light sources and one set of the constituent optical elements, of fixed and movable reflectors. As a result, in comparison with the conventional vehicle headlamp in which a relationship between the numbers of constituent light sources and optical elements is obtained as a relationship (1:3) between one constituent light source and three constituent optical elements (a reflector, a shade, and a projecting lens) and that in which a relationship between the numbers of constituent light sources and optical elements is obtained as a relationship (1:2) between one constituent light source and two constituent optical elements (a reflector and a projecting lens), the vehicle headlamp according to the second aspect of the present invention eliminates an error in combination of dispersions on the optical element side, making it possible to improve precision of assembling the reflectors at the optical element side.

Further, the vehicle headlamp according to the third aspect of the present invention is capable of reliably achieving both of light-distributing and controlling a light distribution pattern for low beam, which is optimal for use in vehicle, and downsizing lamp units, by means for solving the above-described problem.

Furthermore, in the vehicle headlamp according to the forth aspect of the embodiment, the reflecting surfaces of the fixed reflector; the reflecting surfaces of the movable reflectors, and the semiconductor-type light sources are disposed so that the upside units, in which an light emission face of the light emitting chip is oriented upward in the vertical-axis Y direction, becomes point-symmetrical to the downside units, in which a light emission face of the light emitting chip is oriented downward in the vertical-axis direction. As a result, according to the vehicle headlamp of the fourth aspect of the present invention, even if the reflectors are downsized, it is possible to sufficiently obtain luminous intensities of the light distribution pattern for low beam; the light distribution patterns for high beams; and the light distribution patterns for daytime running light; and it is possible to further reliably achieve both of: light-distributing and controlling the light distribution pattern for low beam, the light distribution patterns for high beam, and the light distribution patterns for daytime running light, which are optimal for use in vehicle; and downsizing lamp units.

Still furthermore, in the vehicle headlamp according to the fifth aspect of the embodiment, the luminous quantities (luminous fluxes) of the light distribution patterns for daytime running light can be reduced with respect to the luminous quantities (luminous fluxes) of the light distribution patterns for low beams and the luminous quantities (luminous fluxes) of the light distribution patterns for high beams so that: optimal light distribution patterns for daytime running light are obtained; and power saving can be achieved.

DESCRIPTION OF THE PREFERRED EMBODIMENTS

Figure 11:
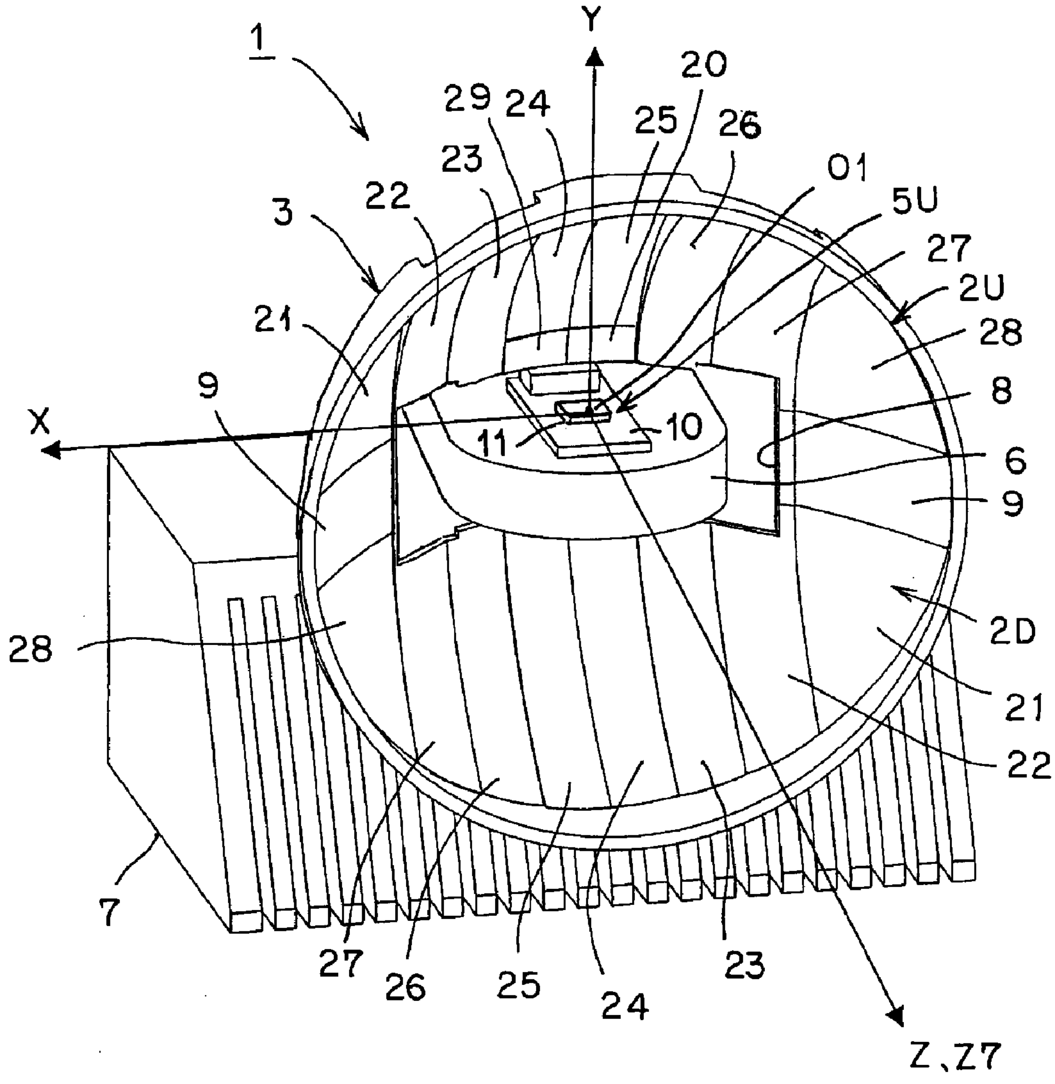
FIG. 11 is a perspective view showing essential portions when the upside and downside movable reflectors and a drive unit are not shown, similarly.
Figure 12:
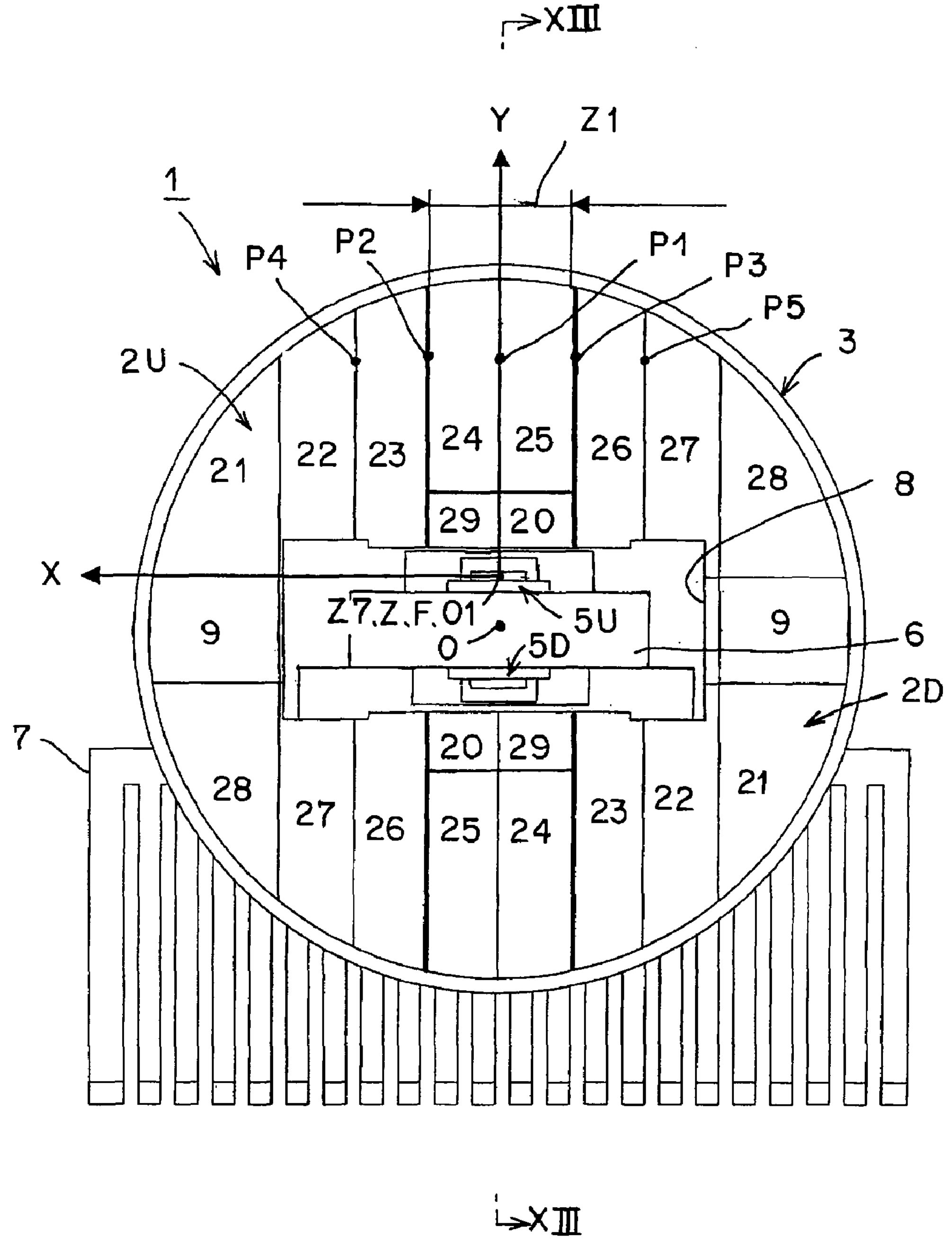
FIG. 12 is a front view showing essential portions when the upside and downside movable reflectors and the drive unit are not shown, similarly.
Figure 13:
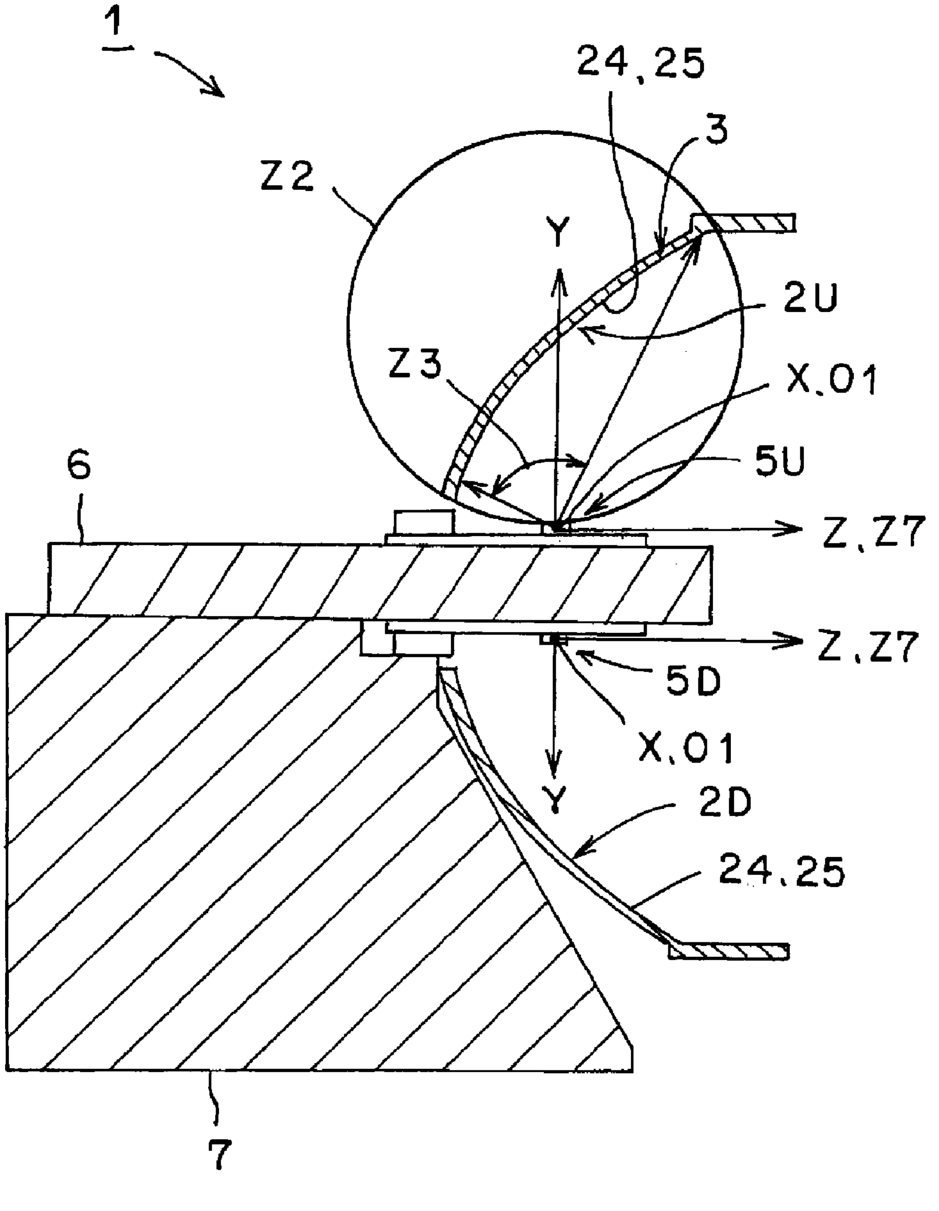
FIG. 13 is a cross-sectional view taken along the line XIII-XIII of FIG. 12, similarly.
Figure 20:
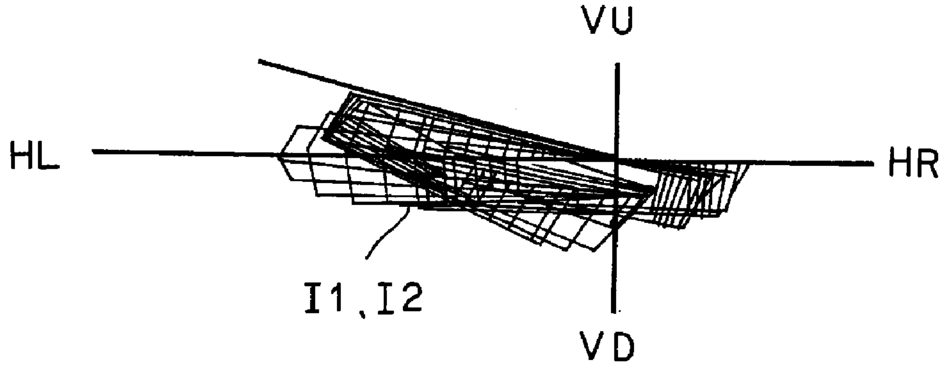
FIG. 20 is an explanatory view showing a reflected-image group of the light emitting chip, obtained on the first reflecting surface made of the fourth segment, similarly.
Figure 21:
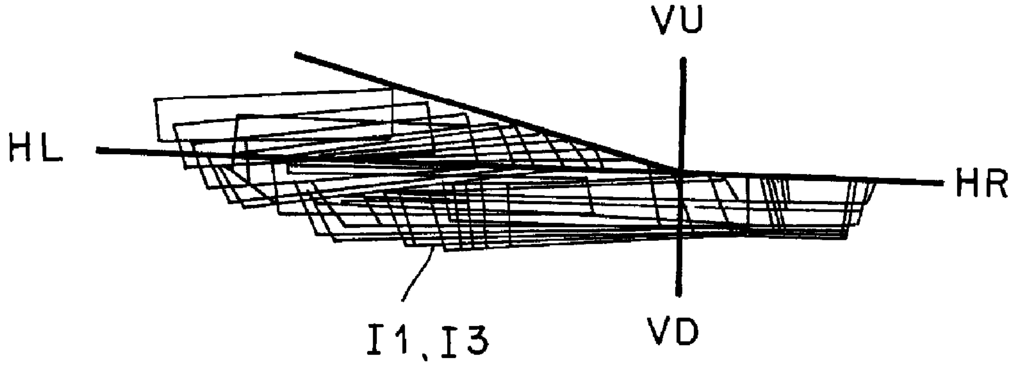
FIG. 21 is an explanatory view showing a reflected-image group of the light emitting chip, obtained on the second reflecting surface made of the fifth segment, similarly.

Hereinafter, embodiments of the present invention will be described in detail, referring to the drawings. These embodiments do not limit the present invention. In the drawings, uppercase letter symbol VU-VD designates an upward-downward vertical line of a screen. Uppercase letter symbol HL-HR designates a leftward-rightward horizontal line of the screen. FIGS. 20 and 21 are explanatory views, each of which shows a reflection image group of a light emitting chip on the screen, which is obtained by computer simulation. In the specification and claims, the terms "top", "bottom", "front", "rear", "left", and "right" correspond to those of a vehicle when the vehicle headlamp according to the present invention is mounted on the vehicle (automobile). In FIGS. 11, 12, and 13, in order to clarify a constitution of the invention, an upside movable reflector 13U, a downside movable reflector 13D, and a drive unit 14 are not shown. Further, in FIGS. 1, 2, 3, and 4, a fin-like shape of a heat sink member 7 is not shown.

Embodiment(S)

Figure 22:
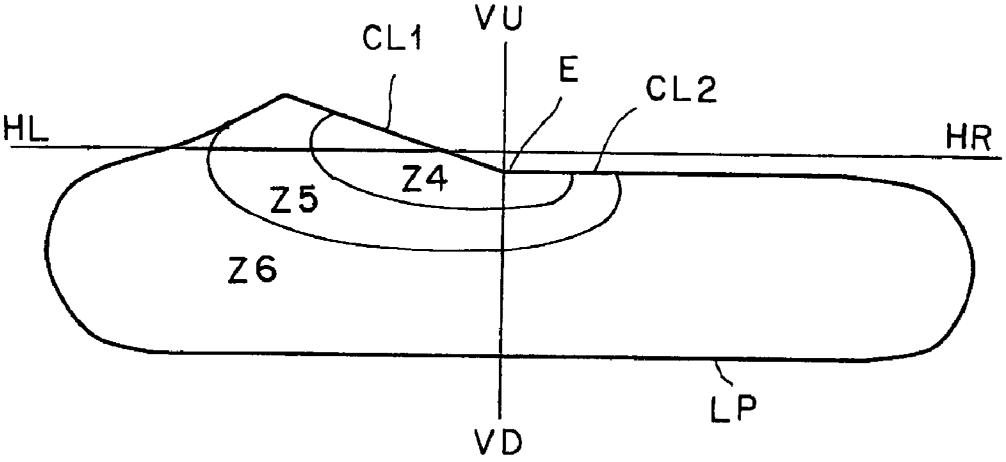
FIG. 22 is an explanatory view showing a light distribution pattern for low beam, having an oblique cutoff line and a horizontal cutoff line, similarly.
Figure 23:
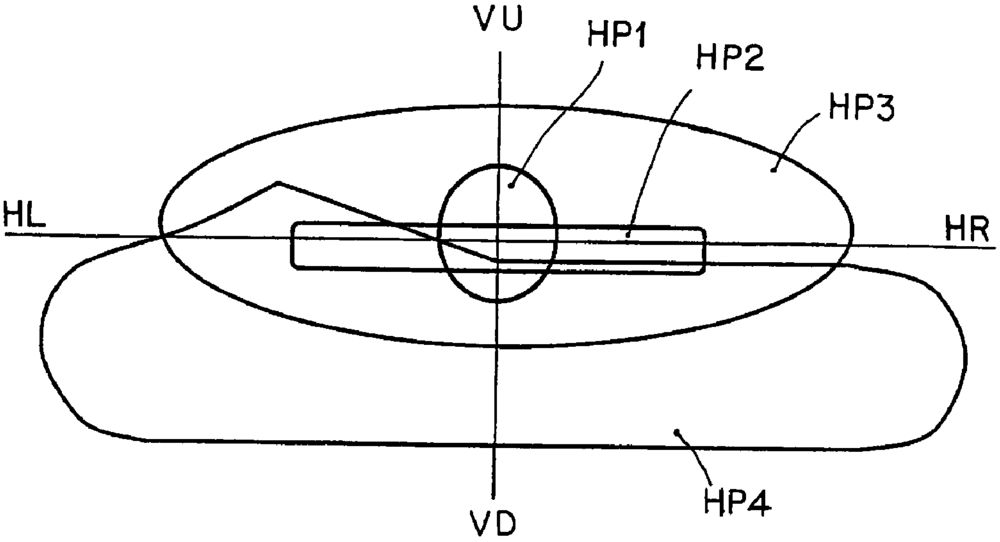
FIG. 23 is an explanatory view showing a light distribution pattern for high beam, similarly.
Figure 24:
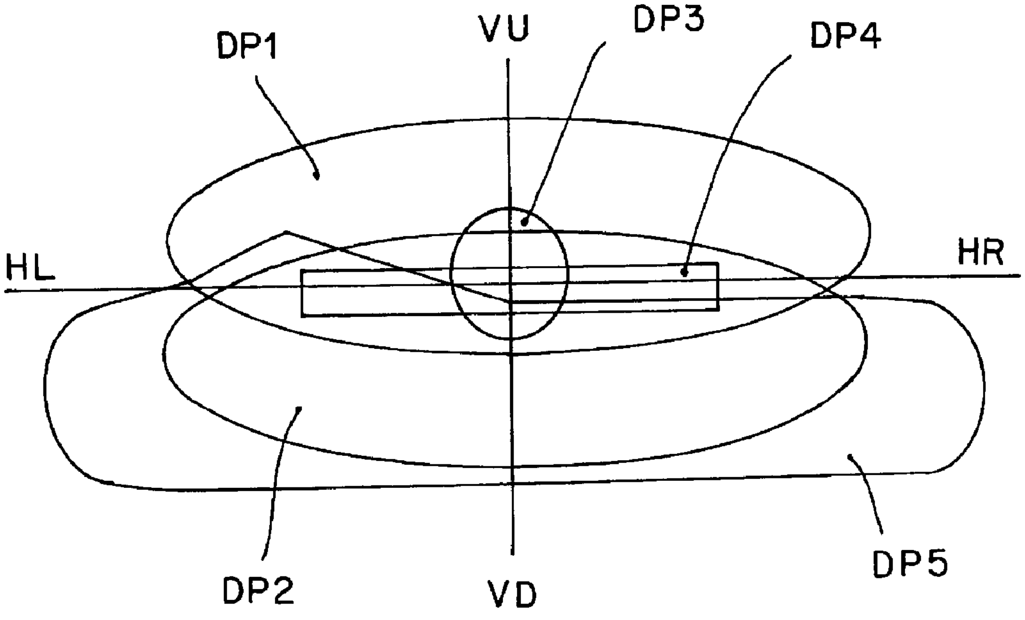
FIG. 24 is an explanatory view showing a light distribution pattern for daytime running light.

Hereinafter, a constitution of the vehicle headlamp of the embodiment will be described. In the figures, reference numeral 1 designates a vehicle headlamp (automobile headlamp) of the embodiment. The vehicle headlamp 1 is intended to change over and illuminate: a light distribution pattern for passing LP (light distribution pattern for low beam), shown in FIG. 22; a light distribution pattern for cruising (light distribution pattern for high beam), shown in FIG. 23; and a light distribution pattern for daytime running light, shown in FIG. 24, to a forward direction of a vehicle. The light distribution pattern LP for low beam, as shown in FIG. 22, has an oblique cutoff line CL1 on a cruising lane side (left side) and a horizontal cutoff line CL2 on an opposite lane side (right side) at the elbow point E. An angle formed between the oblique cutoff line CL1 and a horizontal line HL-HR of a screen is about 15 degrees. The light distribution patterns for high beam, as shown in FIG. 23, are made of: a first light distribution pattern HP1 for high beam; a second light distribution pattern HP2 for high beam; a third light distribution pattern HP3 for high beam; and a fourth light distribution pattern HP4 for high beam (the light distribution pattern that is substantially identical to the light distribution pattern LP for low beam, and is dimmed more than the light distribution pattern LP for low beam). The light distribution patterns for daytime running light, as shown in FIG. 24, are made of: a first light distribution pattern DP1 for daytime running light (the light distribution pattern that is substantially identical to the third light distribution pattern HP3 for high beam; is positioned more upward than the third light distribution pattern HP3 for high beam, and further, dimmed more than the third light distribution pattern HP3 for high beam); a second light distribution pattern DP2 for daytime running light (the light distribution pattern that is substantially identical to the third light distribution pattern HP3 for high beam; is positioned more downward than the third light distribution pattern HP3 for high beam, and further, dimmed more than the third light distribution pattern HP3 for high beam); a third light distribution pattern DP3 for daytime running light (the light distribution pattern that is substantially identical to the first light distribution pattern HP1 for high beam; and dimmed more than the first light distribution pattern HP1 for high beam); a fourth light distribution pattern DP4 for daylight running light (the light distribution pattern that is substantially identical to the second light distribution pattern HP2 for high beam and is dimmed more than the second light distribution pattern HP2 for high beam); and a fifth light distribution pattern DP5 for daytime running light (the light distribution pattern that is substantially identical to the light distribution pattern LP for low beam and is dimmed more than the light distribution pattern LP for low beam).

The vehicle headlamp 1 is made up of: a fixed reflector 3 having an upside reflecting surface 2U and a downside reflecting surface 2D which are made of a parabola-based free curved face (NURBS-curved face); an upside movable reflector 13U having an upside reflecting surface 12U and a downward movable reflector 13D having a downside reflecting surface 12D, which are made of a parabola-based free curved face (NURBS-curved face), similarly; an upside semiconductor-type light source 5U and a downside semiconductor-type light source 5D, a respective one of which has a light emitting chip 4 shaped like a planar rectangle (planar oblong); a holder 6; a heat sink member 7; a drive unit 14; and a lamp housing and a lamp lens (such as a transparent outer lens, for example), although not shown.

The holder 6 is shaped like a plate having an upper fixing face and a lower fixing face. The holder 6 is made up of a resin member or a metal member with its high thermal conductivity, for example. The heat sink member 7 is formed in a trapezoidal shape having an upper fixing face at its upper part and is formed in a fin-like shape from its intermediate part to its lower part. The heat sink member 7 is made up of a resin member or a metal member with its high thermal conductivity, for example.

The fixed reflector 3, the upside movable reflector 13U, the downside movable reflector 13D, the upside semiconductor-type light source 5U, the downside semiconductor light source 5D, the holder 6, the heat sink member 7, and the drive unit 14 constitute lamp units. In other words, the fixed reflector 3 is fixed and held on the holder 6. The upside movable reflector 13U and the downside movable reflector 13D are rotatably mounted on the holder 6 around a horizontal axis X. The upside semiconductor-type light source 5U is fixed and held on an upper fixing face of the holder 6. The downside semiconductor-type light source 5D is fixed and held on a lower fixing face of the holder 6. The holder 6 is fixed and held on an upper fixing face of the heat sink member 7. The drive unit 14 is fixed and held on an upper fixing face of a respective one of the holder 6 and the heat sink member 7.

The lamp units 3, 5U 5D, 6, 7, 13U, 13D, 14 are disposed via an optical axis adjustment mechanism, for example, in a lamp room partitioned by the lamp housing and the lamp lens. In the lamp room, there may be disposed another lamp unit such as a fog lamp, a cornering lamp, a clearance lamp, or a turn signal lamp, other than the lamp units 3, 5U, 5D, 6, 7, 13U, 13D, 14.

The upside reflecting surface 2U of the fixed reflector 3; the upside reflecting surface 12U of the upside movable reflector 13U; and the upside semiconductor-type light source 5U constitute upside units, a respective one of which allows a light emission face of the light emitting chip 4 to be oriented upward in a vertical-axis Y direction. In addition, the downside reflecting surface 2D of the fixed reflector 3; the downside reflecting surface 12D of the downside movable reflector 13D; and the downside semiconductor-type light source 5D constitute downside units, a respective one of which allows a light emission face of the light emitting chip 4 to be oriented downward in the vertical-axis Y direction. The upside units 2U, 5U, 12U, 13U and the downside units 2D, 5D, 12D, 13D, as shown in FIG. 12, are disposed so as to establish a point-symmetrical state around a point O. A reflecting surface design of the upside reflecting surfaces 2U, 12U and a reflecting surface design of the downside reflecting surface 2D, 12D are not a mere point-symmetry (inverted).

The fixed reflector 3 is made of an optically opaque resin member, for example. The fixed reflector 3 is substantially shaped like a rotational parabola face while an axis passing through the point-symmetrical point O is employed as a rotary axis. A foreside of the fixed reflector 3 is opened in a substantially circular shape. A size of an opening at the foreside of the fixed reflector 3 is about 120 mm or less in diameter, preferably about 50 mm or less in diameter. On the other hand, a backside of the fixed reflector 3 is closed. An elongated, substantially oblong window portion is provided at an intermediate part of the closed portion of the fixed reflector 3. The holder 6 is inserted into the window portion 8 of the fixed reflector 3. The fixed reflector 3 is fixed and held on the holder 6 at an outside (backside) of the closed portion.

Of an inside (foreside) of the closed portion of the fixed reflector 3, the upside reflecting surface 2U and the downside reflecting surface 2D are provided at the upside and downside of the window portion 8, respectively. The upside reflecting surface 2U and the downside reflecting surface 2D, made of parabola-based free curved faces (NURBS-curved faces), have a reference focal point (pseudo focal line) F and a reference optical axis (pseudo-optical axis) Z. Of the inside (foreside) of the closed portion of the fixed reflector 3, a reflection-free surface 9 is provided at a respective one of the left and right sides of the window portion 8.

The upside reflecting surface 2U and the downside reflecting surface 2D, of the fixed reflector 3, are made of: a reflecting surface for low beam, forming the light distribution pattern LP for low beam and the fourth light distribution pattern HP4 for high beam; and a first reflecting surface for high beam and daytime running light and a second reflecting surface for high beam and daytime running light, forming the first and second light distribution patterns for high beam HP1 and HP2, respectively.

The drive unit 14 is made up of a motor 15, a drive force transmission mechanism 16, and a spring for movable reflector restoration (not shown). A stepping motor is used as the motor 1 in the embodiment, and is electrically connected to a power source (battery) via a control portion (not shown). The control portion is intended to control a rotation frequency or a rotational angle, of the motor 15. The motor 15 is directly fixed to an upper fixing face of the heat sink member 7. In this manner, a heat generated when the motor 15 is powered ON can be radiated (dissipated) to the outside by means of the heat sink member 7. The drive force transmission mechanism 16 is provided between the motor 15 and a respective one of the upside movable reflector 13U and the downside movable reflector 13D. The drive unit 14 is intended to rotate the upside and downside movable reflectors 13U and 13D among: a first location (the location in the state shown in FIGS. 1, 3, 5, and 9); a second location (the location in the state shown in FIGS. 2, 4, 6 and 10); and a third location (the location in the state shown in FIG. 7 or the location in the state shown FIG. 8) around the horizontal axis X with respect to the holder 6.

Figure 7:
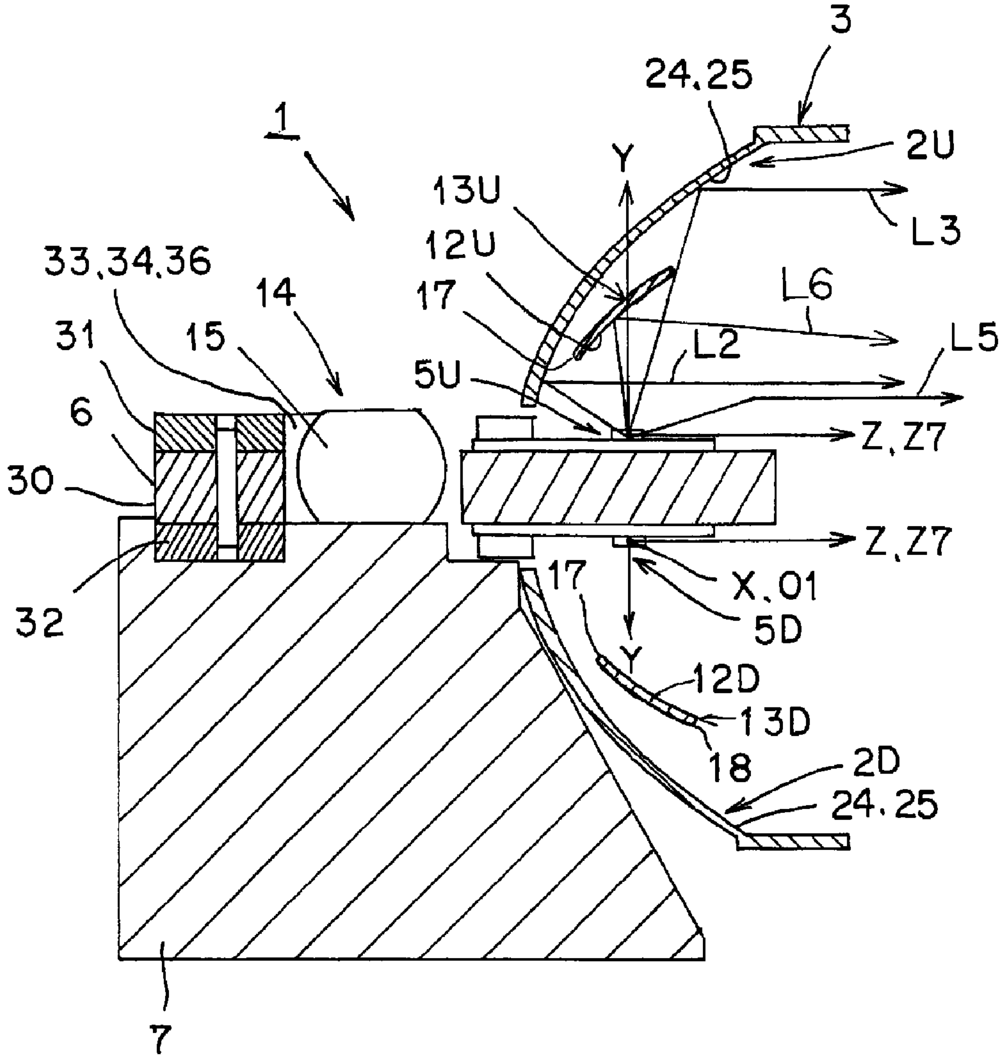
FIG. 7 is a longitudinal cross-sectional view showing an optical path when the upside and downside movable reflectors are positioned in a third location (in a rotational location of about 85 degrees), similarly.
Figure 8:
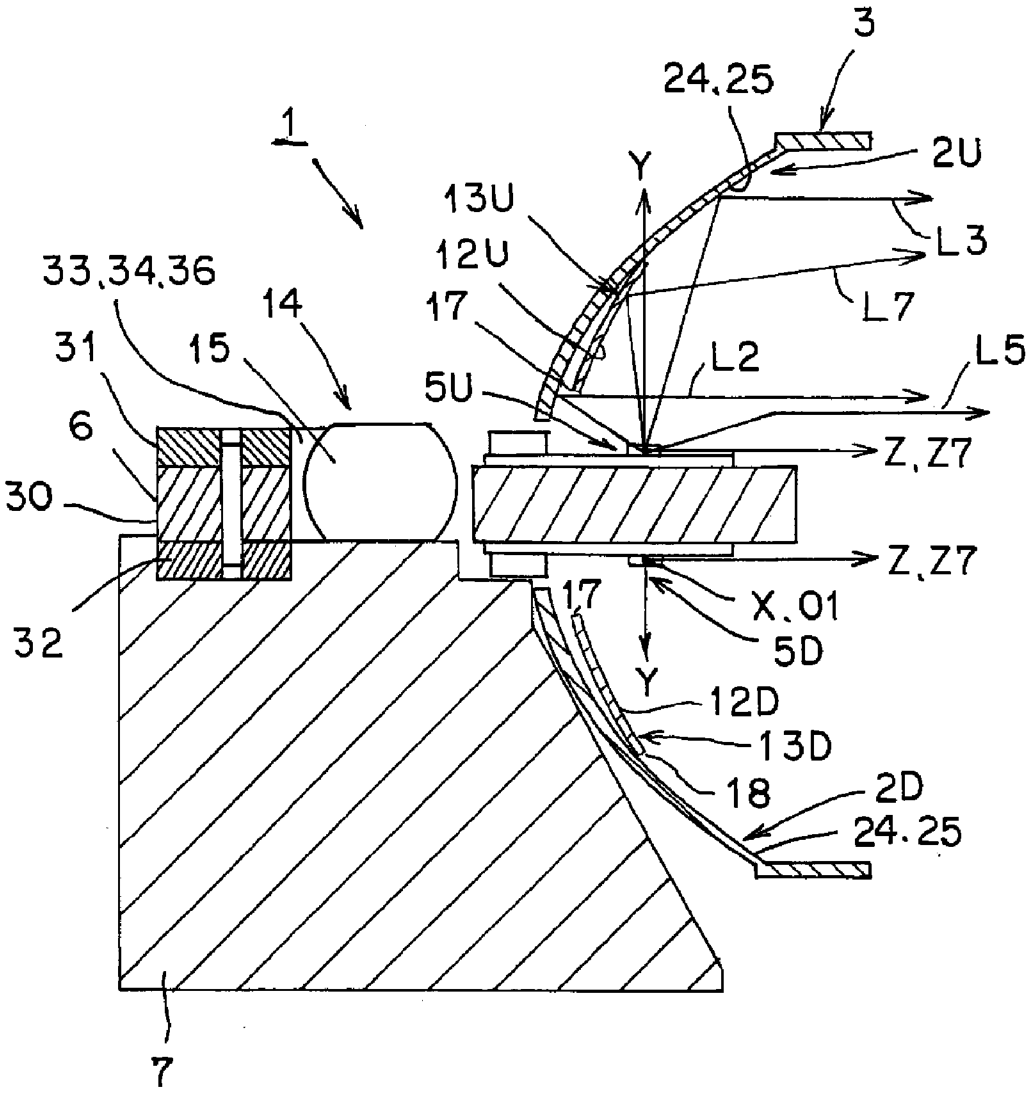
FIG. 8 is a longitudinal cross-sectional view showing an optical path when the upside and downside movable reflectors are positioned in a third location (in a rotational location of about 105 degrees), similarly.

The upside and downside movable reflectors 13U and 13D each are made up of an optically opaque resin member or the like, for example. The upside and downside movable reflectors 13U and 13D, a respective one of which is positioned in the second location, are substantially shaped like a rotational parabola face while an axis passing through the point-symmetrical point O is employed as a rotary axis. In addition, the upside and downside movable reflectors 13U and 13D, a respective one of which is positioned in the third location, are substantially shaped like a rotational parabola face which slightly narrows to the inside, with respect to the upside and downside movable reflectors 13U and 13D, a respective one of which is positioned in the second location, as shown in FIG. 7. Alternatively, the upside and downside movable reflectors 13U and 13D, a respective one of which is positioned in the third location, are substantially shaped like a rotational parabola face which slightly broadens to the outside, with respect to the upside and downside movable reflectors 13U and 13D, a respective one of which is positioned in the second location, as shown in FIG. 8. A foreside of a respective one of the upside and downside movable reflectors 13U and 13D, which are positioned in the second location and the third location, is opened in a substantially circular shape. The size of an opening at the foreside of the respective one of the upside and downside movable reflectors 13U and 13D, i.e., an opening area, is smaller than that of an opening at the foreside of the fixed reflector 3, i.e., an opening area (120 mm or less in diameter, preferably about 50 mm or less in diameter).

A semicircular through hole 17 is provided at a center part of a respective one of the upside and downside movable reflectors 13U and 13D. In addition, a rectangular visor portion 18 is integrally provided at an intermediate part of the periphery of a respective one of the upside and downside movable reflectors 13U and 13D. The upside and downside reflecting surfaces 12U and 12D each are provided on a face at the side opposite to the upside and downside semiconductor-type light sources 5U and 5D of the upside and downside movable reflectors 13U and 13D. The upside and downside reflecting surfaces 12U and 12D, made of a parabola-based free curved face (NURBS-curved face), have a reference focal point (pseudo-focal point) F1 and a reference optical axis (pseudo-optical axis) Z7.

The upside reflecting surface 2U of the upside movable reflector 13U and the downside reflecting surface 2D of the downside movable reflector 13D each are made up of: a third reflecting surface for high beam and daytime running light, forming the third light distribution pattern HP3 for high beam; the first light distribution pattern DP1 for daytime running light; and the second light distribution pattern DP2 for daytime running light.

Figure 14:
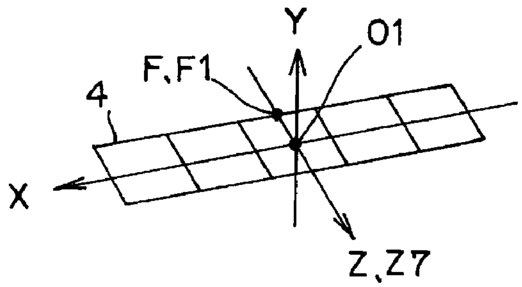
FIG. 14 is an explanatory perspective view showing a relative position relationship between a center of a light emitting chip and a reference focal point of a reflecting surface, similarly.
Figure 15:
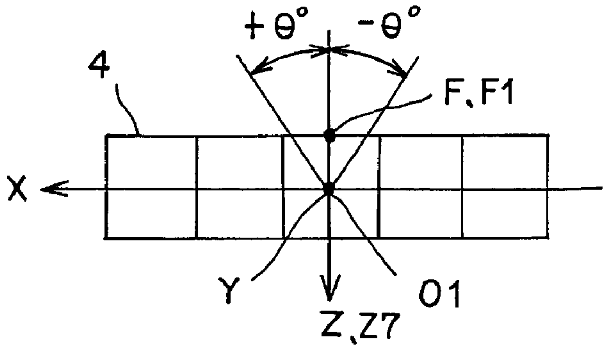
FIG. 15 is an explanatory front view showing a relative position relationship between the center of the light emitting chip and the reference focal point of the reflecting surface, similarly.

The semiconductor-type light sources 5U, 5D each are made up of: a board 10; the light emitting chip 4 provided on the board 10; and a thin rectangle-shaped sealing resin member 11 for sealing the light emitting chip 4. The light emitting chip 4, as shown in FIGS. 14 and 15, is formed by arraying five square chip elements in a horizontal-axis X direction. Alternatively, one rectangular chip may be used. The semiconductor-type light sources 5U, 5D are electrically connected to a power source (battery) via a dimming control portion (not shown). The dimming control portion is a PWD-control, which is intended to decrease or increase a duty ratio of a pulse width for power supply to the semiconductor-type light sources 5Um 5D or a duty ratio of a pulse width for power shutdown with respect to a time axis, by means of a binary notation pulse-width modulation. As a result, the dimming control portion is intended to decrease, by from 100% to 10% (100–10), for example, the light which is radiated from the light emitting chip 4 of a respective one of the semiconductor-type light sources 5U, 5D when the upside and downside movable reflectors 13U and 13D are positioned in the third location, with respect to the one radiated from the light emitting chip 4 of a respective one of the semiconductor-type light sources 5U, 5D when the upside and downside movable reflectors 13U and 13D are positioned in the first location or the second location.

The center O1 of the light emitting chip 4 is positioned at or near reference focal points F, F1, of the reflecting surfaces 2U, 2D, 12U, 12D, and is positioned on the reference optical axes Z, Z7, of the reflecting surfaces 2U, 2D, 12U, 12D. In addition, the light emission face of the light emitting chip 4 (the face opposite to a face opposed to the board 10) is oriented in the vertical-axis Y direction. In other words, the light emission face of the light emitting chip 4 of the upside semiconductor-type light source 5U is oriented upward in the vertical-axis Y direction. On the other hand, the light emission face of the light emitting chip 4 of the downside semiconductor-type light source 5D is oriented downward in the vertical-axis Y direction. Further, a long side of the light emission chip 4 is parallel to the horizontal axis X which is orthogonal to the reference optical axes Z, Z7 and the vertical axis Y. The horizontal axis X passes through the center O1 or its proximity, of the light emission chip 4 (between the center O1 of the light emission chip 4 and a long side at the backside of the light emission chip 4 and on a long side at the backside of the light emission chip 4), or alternatively, passes through the reference focal points F, F1 or its proximity, of the reflecting surfaces 2U, 2D, 12U, 12D.

The horizontal axis X, the vertical axis Y, and the reference optical axes Z, Z7 constitute an orthogonal coordinate (X-Y-Z orthogonal coordinate system) while the center O1 of the light emitting chip 4 is employed as an origin. In the horizontal axis X, in the case of the upside units 2U, 5U, 12U, the right side corresponds to a positive direction; and the left side corresponds to a negative direction. In the case of the downside units 2D, 5D, 12D, the left side corresponds to a positive direction; and the right side corresponds to a negative direction. In the vertical axis Y, in the case of the upside units 2U, 5U, 12U, the upside corresponds to a positive direction; and the downside corresponds to a negative direction. In the case of the downside units 2D, 5D, 12D, the downside corresponds to a positive direction; and the upside corresponds to a negative direction. In the reference optical axes Z, Z7, in the case of the upside and downside units 2U, 2U and 2D, 5D, the foreside corresponds to a positive direction and the backside corresponds to a negative direction.

The reflecting surfaces 2U, 2D of the fixed reflector 3 and the reflecting surfaces 12U, 12D of the movable reflectors 13U, 13D are made up of parabola-based free curved faces (NURBS-curved faces). A reference focal point F of the reflecting surfaces 2U, 2D of the fixed reflector and a reference focal point F1 of the reflecting surfaces 12U, 12D of the movable reflectors 13U, 13D are coincident or substantially coincident with each other; are on the reference optical axes Z, Z7; are positioned between the center O1 of the light emitting chip 4 and a long side at the backside of the light emitting chip 4; and are positioned on a long side at the backside of the light emitting chip 4 in the embodiment. In addition, a reference focal point distance of the reflecting surfaces 2U, 2D of the fixed reflector 3 is about 10 to 18 mm, and is greater than the reference focal point distance F1 of the reflecting surfaces 12U, 12D of the movable reflectors 13U, 13D.

The reference optical axis Z of the reflecting surfaces 2U, 2D of the fixed reflector 9 and the reference optical axis Z7 of the reflecting surfaces 12U, 12D of the movable reflectors 13U, 13D when these movable reflectors are positioned in a second location, are coincident or substantially coincident with each other, and are orthogonal to the horizontal axis X, and further, pass through the center O1 or its proximity, of the light emitting chip 4. The reference optical axis Z7 of the reflecting surfaces 12U, 12D of the movable reflector 13U, 13D is oriented forward from the center O1 or its proximity, of the light emitting chip 4, and is oriented upward with respect to the reference optical axis Z of the reflecting surfaces 2U, 2D of the fixed reflector 9.

Figure 1:
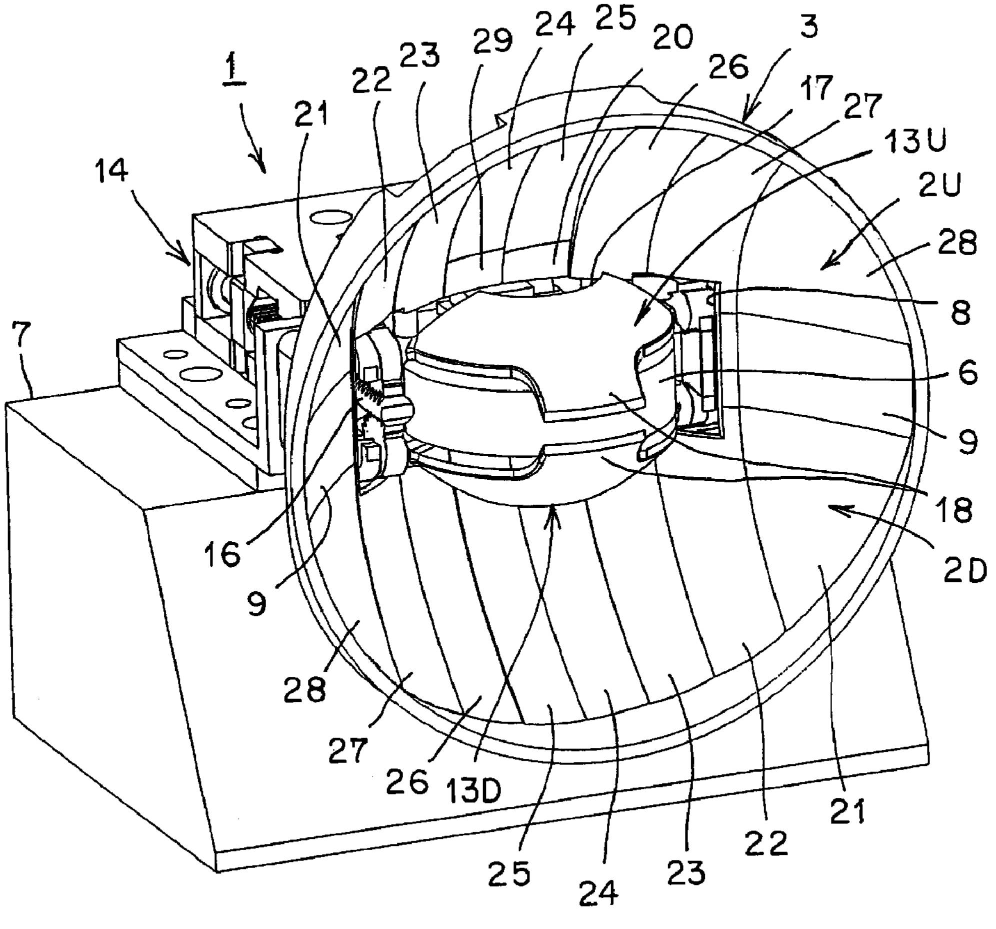
FIG. 1 shows an embodiment of a vehicle headlamp according to the present invention, and is a perspective view of essential portions when an upside movable reflector and a downside movable reflector are positioned in a first location.
Figure 2:
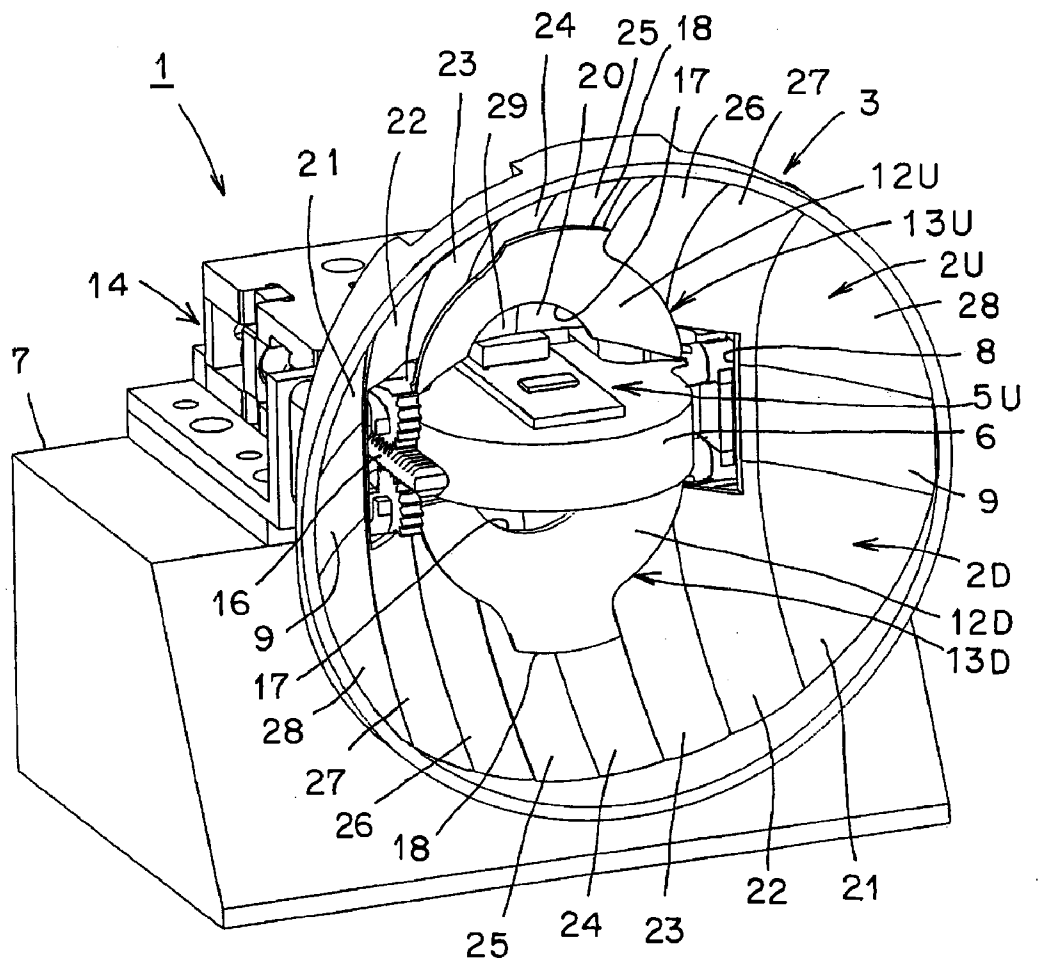
FIG. 2 is a perspective view showing essential portions when the upside movable reflector and the downside movable reflector are positioned in a second location, similarly.
Figure 3:
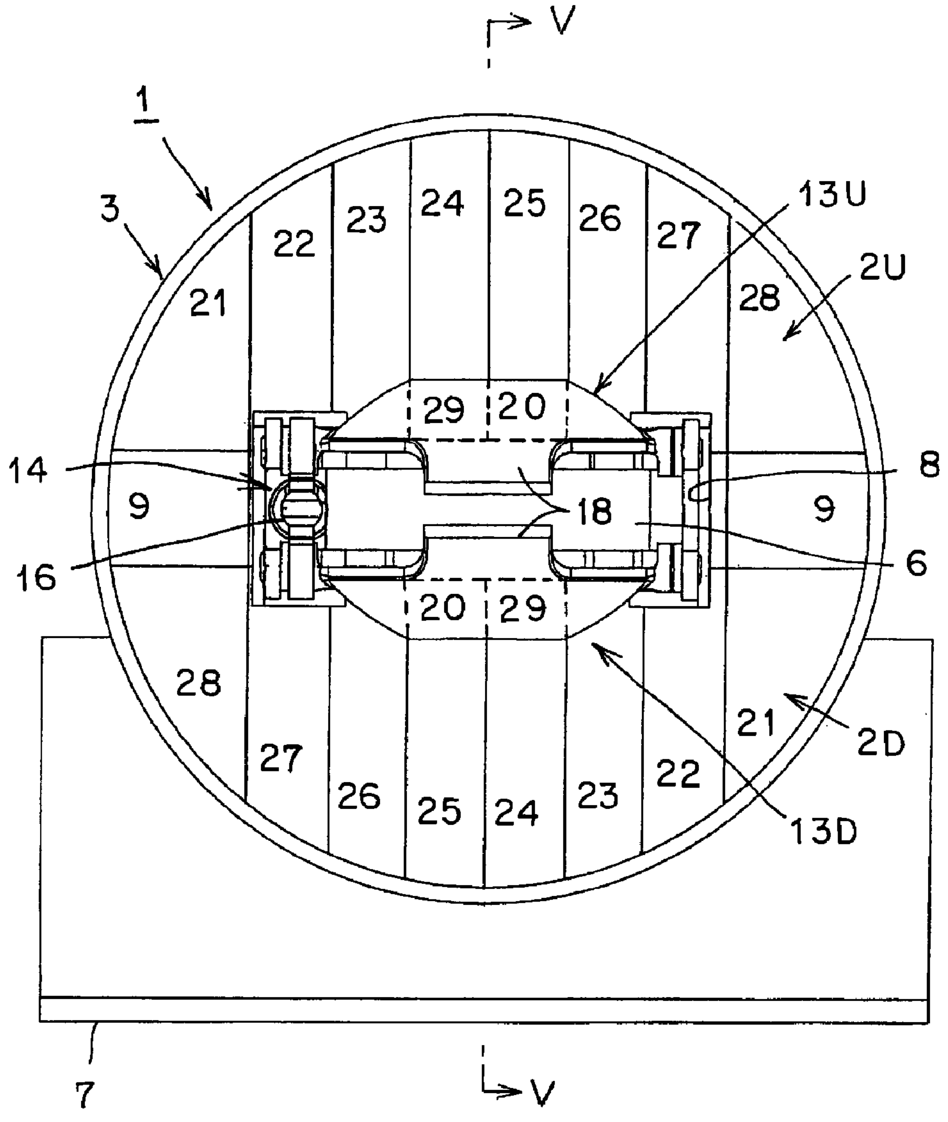
FIG. 3 is a front view showing essential portions when the upside movable reflector and the downside movable reflector are positioned in the first location, similarly.
Figure 4:
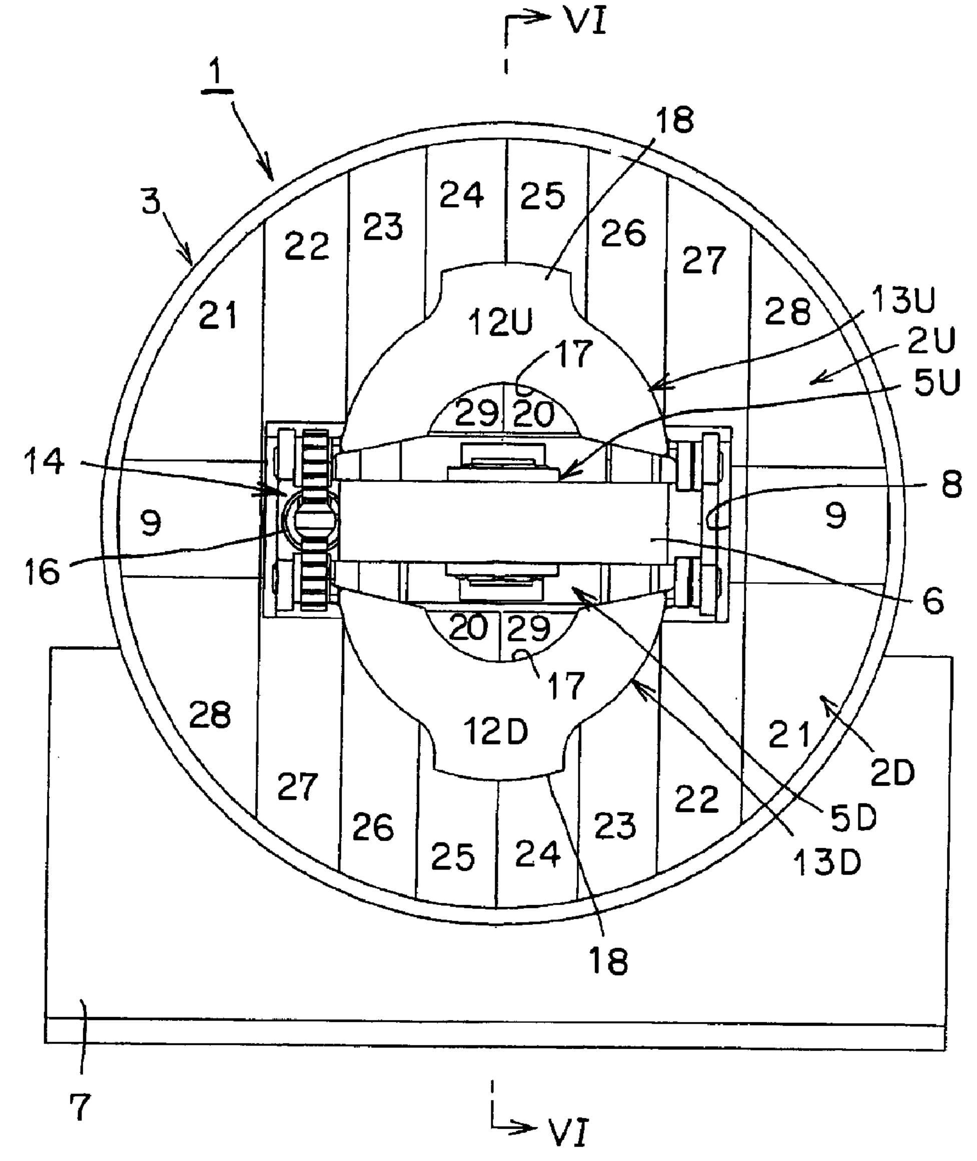
FIG. 4 is a front view showing essential portions when the upside movable reflector and the downside movable reflector are positioned in the second location, similarly.
Figure 5:
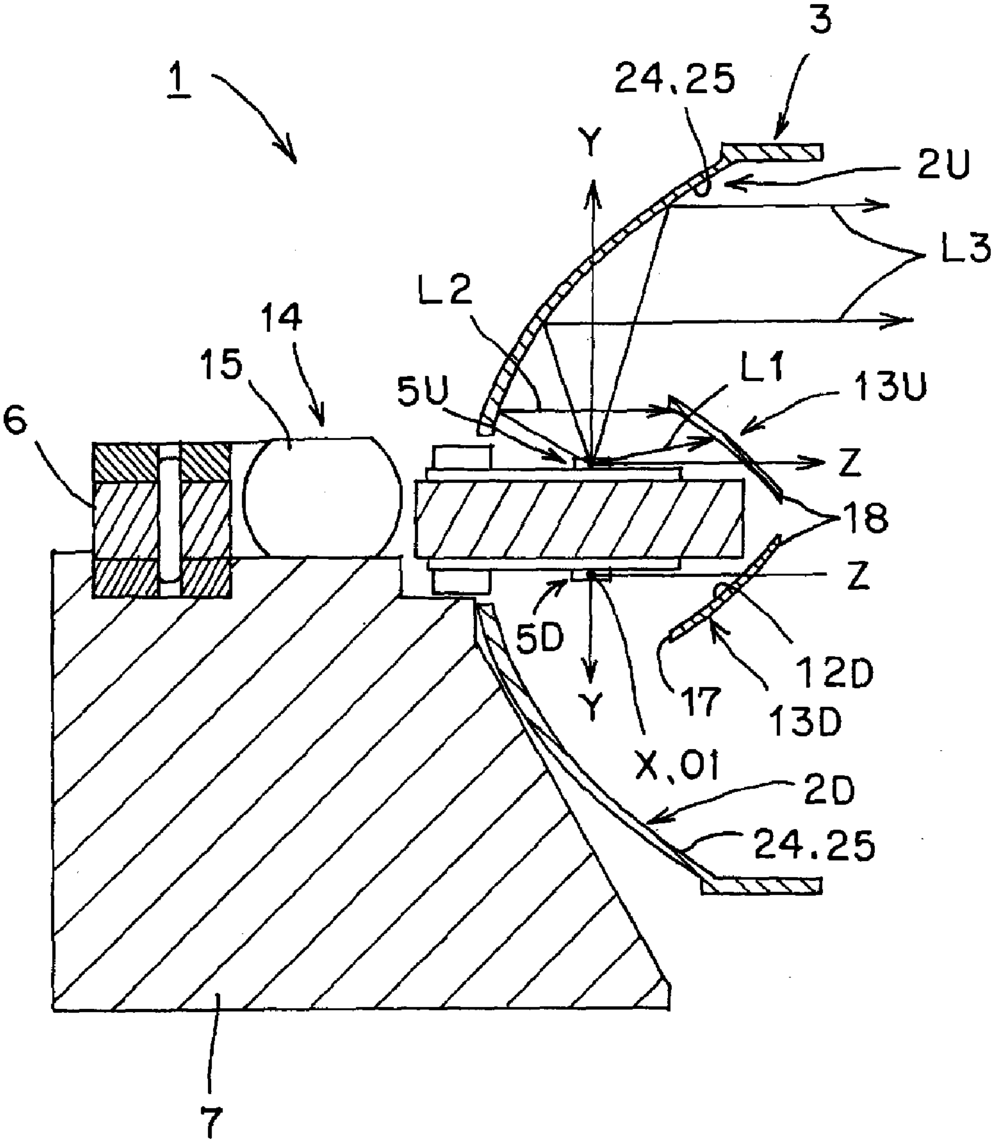
FIG. 5 is a cross-sectional view taken along the line V-V of FIG. 3, showing an optical path, similarly.

When the movable reflectors 13U, 13D are positioned in the first location, as shown in FIG. 5, light L1 radiated from the light emitting chip 4 for high beam and daytime running light, and reflection light L2 reflected on the second reflecting surface for high beam and daytime running light, of the fixed reflector 3, are shaded by means of the movable reflectors 13U, 13D. As a result, reflection light L3 reflected on the reflecting surface for low beam, of the fixed reflector 3, is illuminated toward a forward direction of a vehicle, as the light distribution pattern LP for low beam (light distribution pattern for passing), shown in FIGS. 22.

Figure 6:
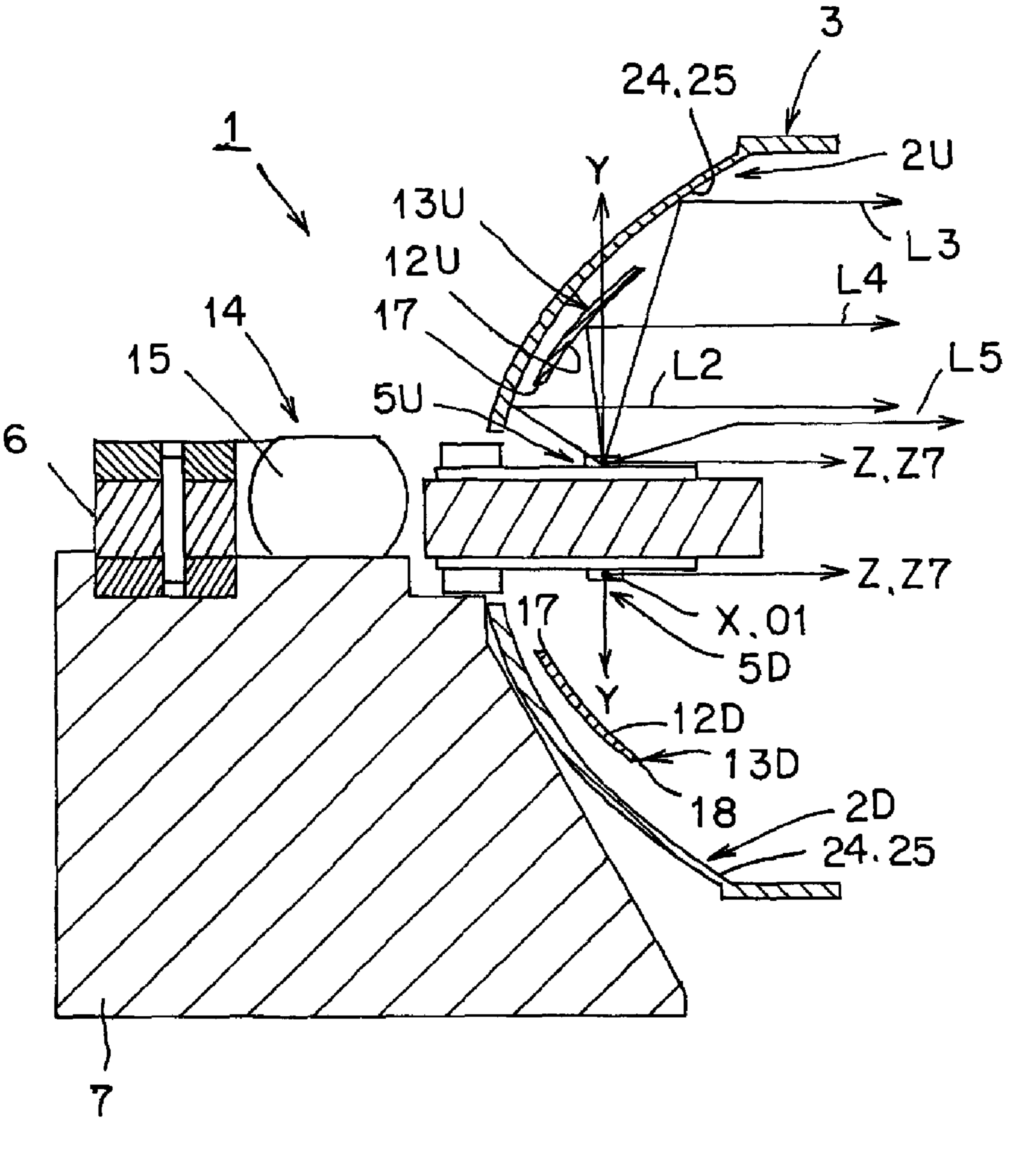
FIG. 6 is a cross-sectional view taken along the line VI-VI of FIG. 4, showing an optical path, similarly.

When the movable reflectors 13U, 13D are positioned in the second location, as shown in FIG. 6, reflection light L4 reflected on the third reflecting surfaces for high beam and daytime running light (the reflecting surfaces 12U, 12D), of the movable reflectors 13U, 13D, is illuminated toward the forward direction of the vehicle, as the third light distribution pattern HP3 for high beam, shown in FIG. 23; reflection light beams L5, L2 reflected on the first and second reflecting surfaces for high beams and daytime running light, of the fixed reflector 3, as the first and second light distribution patterns HP1 and HP2 for high beams; and the reflection light L3 reflected on the reflecting surface for low beam, of the fixed reflector 3, as the fourth light distribution pattern HP4 for high beam, shown in FIG. 23, respectively. As shown in FIG. 23, a light distribution pattern for high beam (light distribution pattern for cruising) is formed by the first, second, third, and fourth light distribution patterns HP1, HP2, HP3, and HP4 for high beams, and is illuminated toward the forward direction of the vehicle.

Figure 10:
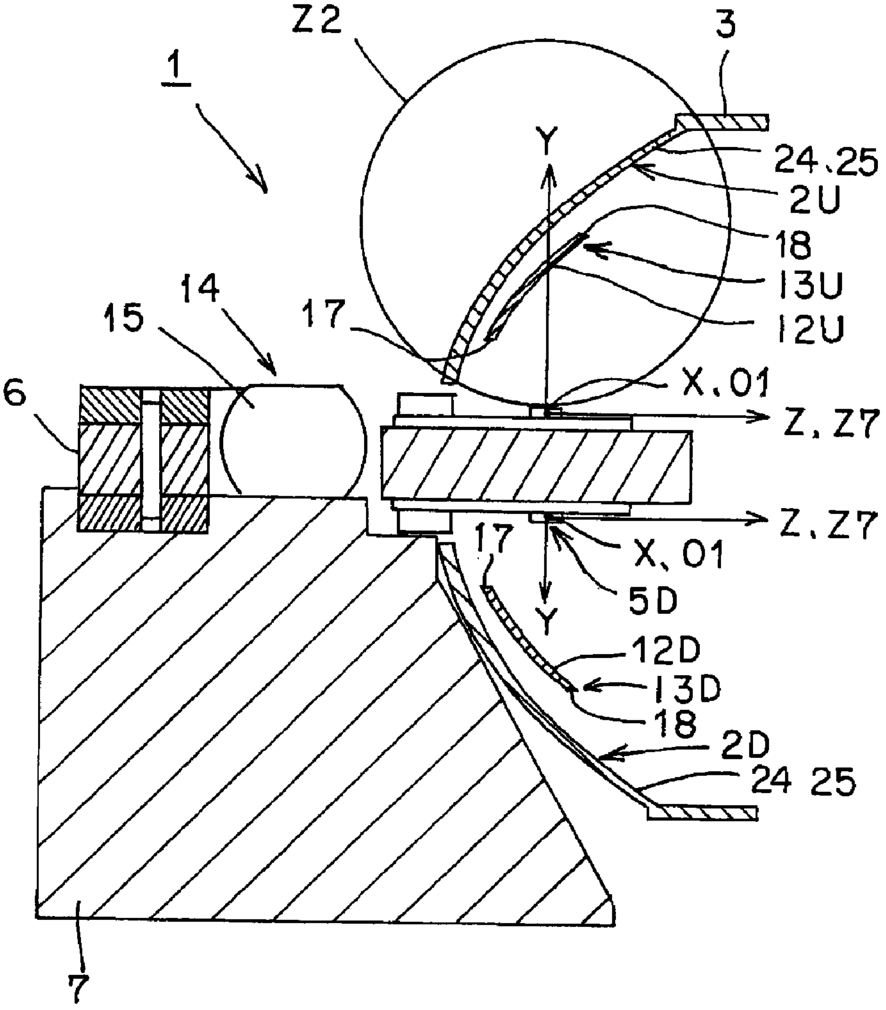
FIG. 10 is a cross-sectional view taken along the line VI-VI of FIG. 4, showing an energy distribution of a semiconductor-type light source, similarly.

When the movable reflectors 13U, 13D are positioned in the second location, as shown in FIG. 6, a part of the light which is radiated from the light emitting chip 4 to the reflecting surface for low beam, of fixed reflector 3, is reflected by means of the movable reflectors 13U, 13D, and is reflected as reflection light L4 on the third reflecting surfaces (the reflecting surfaces 12U, 12D) for high beam and daytime running light, of the movable reflectors 13U, 13D. In other words, a part of the light from the light emitting chip 4 is changed from the light distribution pattern HP4 for high beam (light distribution pattern LP for low beam) to the third light distribution pattern HP3 for high beam. Thus, the light quantity of the fourth light distribution pattern HP4 for high beam, shown in FIG. 23, is smaller than that of the light distribution pattern LP for low beam, shown in FIG. 22. On the other hand, the light from the light emitting chip 4, reflected by means of the movable reflectors 13U, 13D when the upside and downside movable reflectors 13U, 13D are positioned in the first location, is utilized as the first and second light distribution patterns HP1 and HP2 for high beams. At this time, as shown in FIGS. 10 and 13, the reflecting surfaces 12U, 12D of the movable reflectors 13U, 13D are positioned in a range Z3 of high energy in an energy distribution Z2 of the light emitting chip 4. As a result, from the comprehensive point of view, a respective one of the light quantities of the light distribution patterns HP1, HP2, HP3, HP4 for high beam (light distribution patterns for cruising), shown in FIG. 23, is greater than that of the light distribution pattern LP for low beam (light distribution pattern for passing), shown in FIG. 22.

When the movable reflectors 13U, 13D are positioned in the third location, as shown in FIG. 7 or FIG. 8, reflection light L6 reflected on the third reflecting surfaces (the reflecting surfaces 12U, 12D) for high beam and daytime running light, of the movable reflectors 13U, 13D, is close-shifted or open-shifted, and then, is illuminated toward the forward direction of the vehicle, as the first and the second light distribution patterns DP1 and DP2 for daytime running light, shown in FIG. 24; and the reflection light beams L5, L2 reflected on the first and second reflecting surfaces for high beams and day time running light, of the fixed reflector 3, as the third and fourth light distribution patters DP3 and DP4 for daytime running light, shown in FIG. 24; and further, the reflection light L3 reflected on the reflecting surface for low beam, of the fixed reflector 3, as the fifth light distribution pattern DP5 for daytime running light, shown in FIG. 24, respectively. As shown in FIG. 24, light distribution patterns for daytime running light are formed by the first, second, third, fourth, and fifth light distribution patterns DP1, DP2, DP3, DP4, and DP5 for daytime running light, and are illuminated toward the forward direction of the vehicle.

When the movable reflectors 13U, 13D are positioned in the third location, as shown in FIG. 7 or FIG. 8, a part of the light which is radiated from the light emitting chip 4 to the reflecting surface for low beam, of the fixed reflector 3, is shaded by means of the movable reflectors 13U, 13D, and is reflected as reflection light L6 or L7 on the third reflecting surfaces (the reflecting surfaces 12U, 12D) for high beam and daytime running light, of the movable reflectors 13U, 13D. In other words, a part of the light from the light emitting chip 4 is changed from the fifth light distribution pattern DP5 for daytime running light (the light distribution pattern LP for low beam) to the first and second light distribution patterns DP1 and DP2 for daytime running light. Thus, the light quantity of the fifth light distribution pattern DP5 for daytime running light, shown in FIG. 24, is smaller than that of the light distribution pattern LP for low beam, shown in FIG. 22. On the other hand, the light from the light emitting chip 4, which is shaded by means of the movable reflectors 13U, 13D when the upside and downside movable reflectors 13U, 13D are positioned in the first location, is utilized as the third and fourth light distribution patterns DP3 and DP4 for daytime running light. At this time, as is the case with when the movable reflectors 13U, 13D are positioned in the second location, the reflecting surfaces 12U, 12D of the movable reflectors 13U, 13D are positioned in the range Z3 of Z3 of high energy in the energy distribution Z2 of the light emitting chip 4.

The reflecting surfaces 2U, 2D are divided into eight sections in the vertical axis Y direction and are made up of segments 21, 22, 23, 24, 25, 26, 27, 28, 29, 20, of which the central two segments are divided into two sections, respectively, in the horizontal-axis X direction. The second segment 22, the third segment 23, the fourth segment 24, the fifth segment 25, the sixth segment 26, and the seventh segment 27, of the central portion and the peripheral portion, constitute the reflecting surface for low beam. In addition, the first segment 21 and the eighth segment of 28 both end portions constitute the first reflecting surface for high beam and daytime running light. Further, the ninth segment 29 and the tenth segment 20 of the central portion constitute the second reflecting surface for high beam and daytime running light.

On the reflecting surface of the low beam, the fourth segment 24 of the central portion constitutes a first reflecting surface. In addition, the fifth segment 25 of the central portion constitutes a second reflecting surface. Further, the second segment 22, the third segment 23, the sixth segment 26, and the seventh segment 27, of the end portions, constitute a third reflecting surface.

Figure 16:
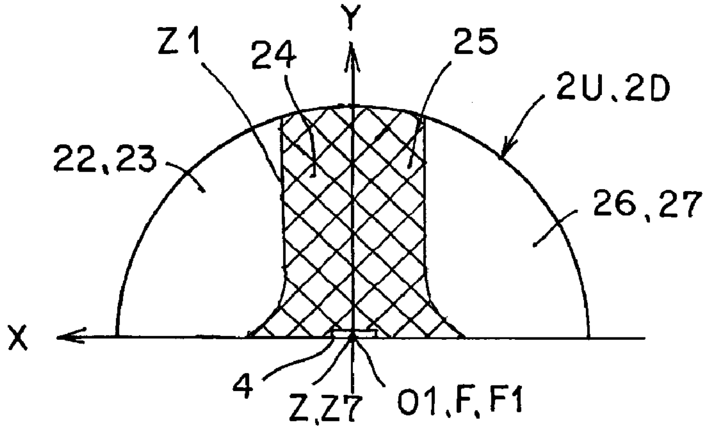
FIG. 16 is an explanatory front view showing a range in which a first reflecting surface made of a fourth segment and a second reflecting surface made of a fifth segment are to be provided.

The fourth segment 24 of the first reflecting surface and the fifth segment 25 of the second reflecting surface, of the central portion, are provided in a range Z1 between two longitudinal, thick solid lines of FIG. 12, the range Z1 being indicated by the grid dashed line of FIG. 16, i.e., the range Z1 being within a longitudinal angle of ±40 degrees (±8 degrees of FIG. 15) from the center O1 of the light emitting chip 4. The second segment 22, the third segment 23, the sixth segment 26, and the seventh segment 27 of the third reflecting surface of the end portions are provided in a white-ground range of FIG. 16 other than the range Z1, i.e., in a range beyond the longitudinal angle of ±40 degrees from the center O1 of the light emitting chip 4.

Figure 17:
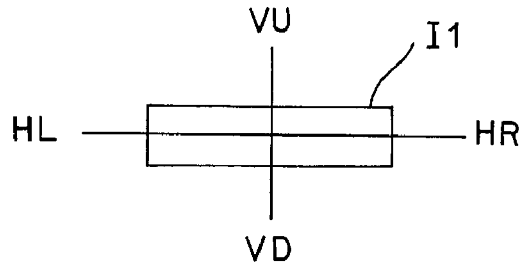
FIG. 17 is an explanatory view showing a reflection image of a light emitting chip, obtained at a point P1 of a reflecting surface, similarly.
Figure 18:
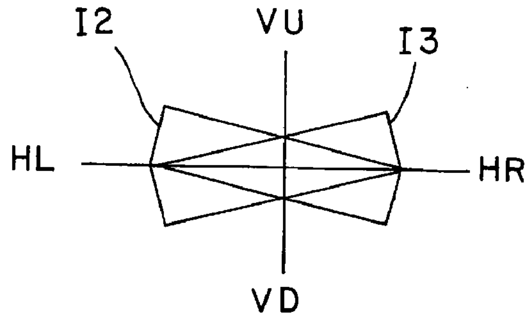
FIG. 18 is an explanatory view showing a reflection image of the light emitting chip, obtained at points P2, P3 of the reflecting surface, similarly.
Figure 19:
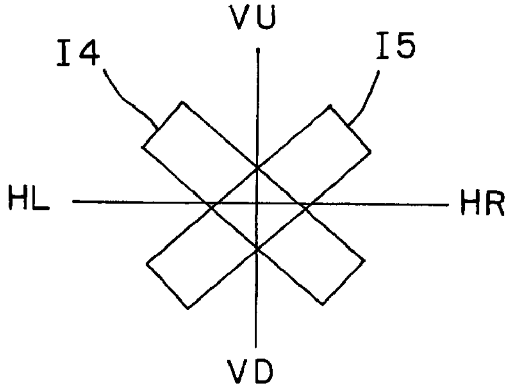
FIG. 19 is an explanatory view showing a reflection image of the light emitting chip, obtained at points P4, P5 of the reflecting surface, similarly.

Hereinafter, a reflection image (screen map) of the light emitting chip 4 shaped like a planar rectangle, which is obtained in segments 22 to 27 of the low-beam reflecting surface, of the reflecting surfaces 2U, 2D, will be described referring to FIGS. 17, 18, and 19. In other words, a reflection image I1 of the light emitting chip 4 with an inclination angle of about 0 degrees with respect to the horizontal line HL-HR of a screen is obtained at a boundary P1 between the fourth and fifth segments 24 and 25, as shown in FIG. 17. In addition, a reflection image I2 of the light emitting chip 4 with an inclination angle of about 20 degrees with respect to the horizontal line HL-HR of the screen is obtained at a boundary P2 between the third and fourth segments 23 and 24, as shown in FIG. 18. Further, a reflection image I3 of the light emitting chip 4 with an inclination angle of about 20 degrees with respect to the horizontal line HL-HR of the screen is obtained at a boundary P3 between the fifth and sixth segments 25 and 26, as shown in FIG. 18. Furthermore, a reflection image I4 of the light emitting chip 4 with an inclination angle of about 40 degrees with respect to the horizontal line HL-HR of the screen is obtained at a boundary P4 between the second segment 22 and the third segment 23, as shown in FIG. 19. Still furthermore, a reflection image I5 of the light emitting chip 4 with an inclination angle of 40 degrees with respect to the horizontal line HL-HR of the screen is obtained at a boundary P5 between the sixth and seventh segments 26 and 27, as shown in FIG. 19.

As a result, in the fourth segment 24 of the low-beam reflecting surface, reflection images from the reflection image I1 with its inclination angle of about 0 degrees, shown in FIG. 17, to the reflection image I2 with its inclination angle of 20 degrees, shown in FIG. 18, are obtained. In addition, in the fifth segment 25 of the low-beam reflecting surface, reflection images from the reflection image I1 with its inclination angle of about 0 degrees, shown in FIG. 17, to the reflection image I3 with its inclination angle of 20 degrees, shown in FIG. 18, are obtained. Further, in the third segment 23 of the low-beam reflecting surface, reflection images from the reflection image I2 with its inclination angle of about 20 degrees, shown in FIG. 18, to the reflection image I4 with its inclination angle of about 40 degrees, shown in FIG. 19, are obtained. Furthermore, in the sixth segment 26 of the reflecting surface for low beam, reflection images from the reflection image I3 with its inclination angle of about 20 degrees, shown in FIG. 18, to the reflection image I5 with its inclination angle of about 40 degrees, shown in FIG. 19, are obtained. Still furthermore, in the second and seventh segments 22 and 27 of the low-beam reflecting surface, a reflection image with its inclination angle of about 40 degrees or more is obtained.

Here, reflection images from the reflection image I1 with its inclination angle of about 0 degrees, shown in FIG. 17, to the reflection images I2, I3 each having an inclination angle of about 20 degrees, shown in FIG. 18, are reflection images which are optimal to form a light distribution including an oblique cutoff line CL1 of the light distribution pattern LP for low beam. This is because it is easy to take reflection images from the reflection image I1 with its inclination angle of about 0 degrees to the reflection images I2, I3 each having an inclination angle of about 20 degrees along the oblique cutoff line CL1 having an inclination angle of about 15 degrees. On the other hand, reflection images each having an inclination angle of 20 degrees or more, including the reflection images I4, I5 each having an inclination angle of about 40 degrees, shown in FIG. 19, are reflection images which are not suitable to form a light distribution including the cutoff line CL1 of the light distribution pattern LP for low beam. This is because if the reflection image with its inclination angle of about 20 degrees is taken along the oblique cutoff line with its inclination angle of about 15 degrees, a light distribution becomes thicker in a vertical direction, resulting in excessive short-distance light distribution (i.e., the light distribution of which long-distance visibility is lowered).

Figure 9:
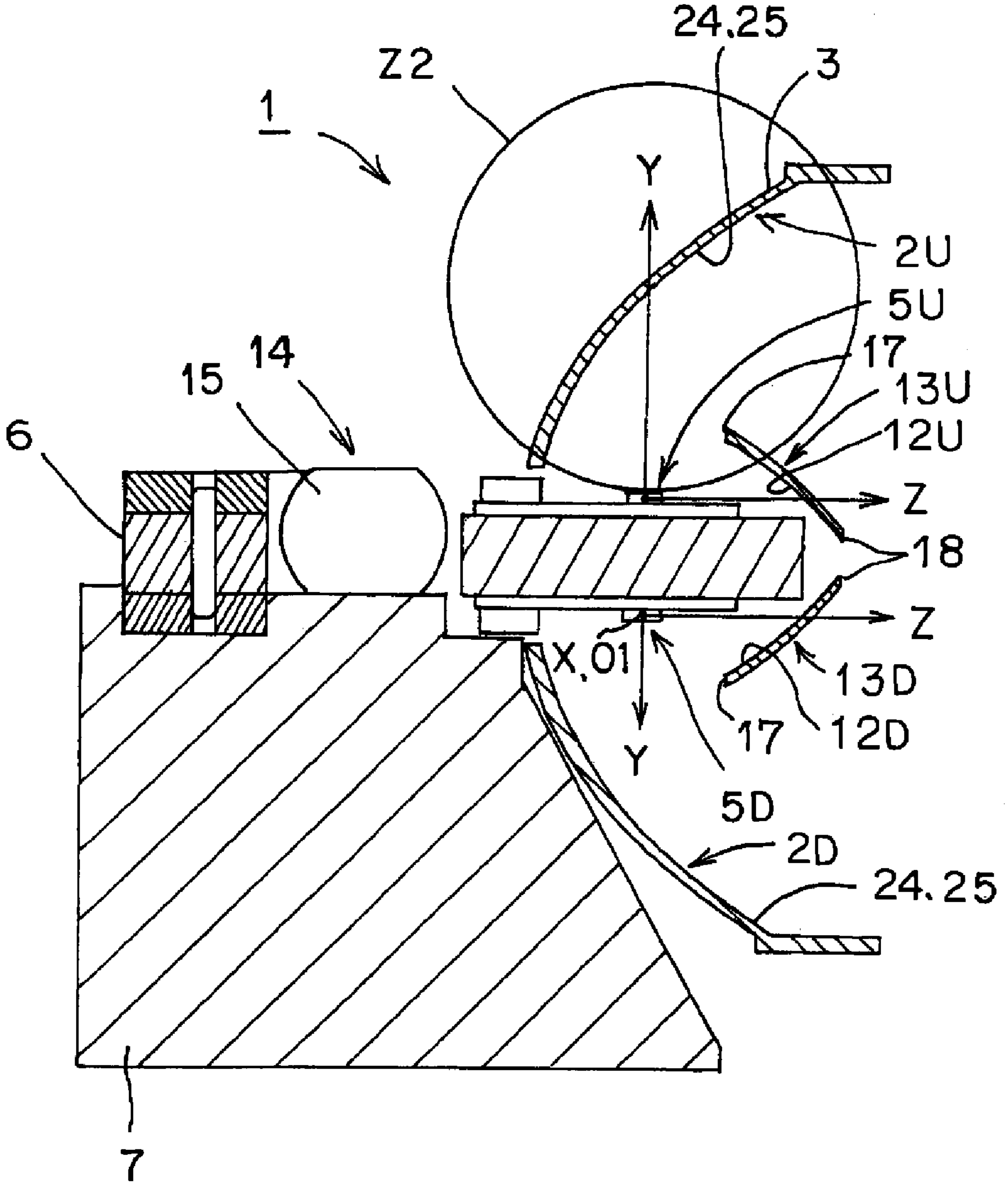
FIG. 9 is a cross-sectional view taken along the line V-V of FIG. 3, showing an energy distribution of a semiconductor-type light source, similarly.

In addition, a light distribution in the oblique cutoff line CL1 is responsible for a light distribution with its long-distance visibility. Thus, there is a need to form a high luminous intensity zone (high energy zone) for the light distribution in the oblique cutoff line CL1. Therefore, the fourth segment 24 of the first reflecting surface and the fifth segment 25 of the second reflecting surface, of the central portion, are included in the range Z3 of high energy in the energy distribution (Lambertian) Z2 of the light emitting chip 4. In FIGS. 9, 10, and 13, the energy distribution of the downside semiconductor-type light source 5D is not shown.

From the foregoing description, the reflecting surface optimal to form a light distribution in the oblique cutoff line CL1 is determined according to a relative relationship between: a range in which the reflection images I1, I2 each having an inclination angle of 20 degrees or less are obtained from the reflecting surfaces of parabola-based free curved faces; and the energy distribution (Lambertian) of the semiconductor-type light sources 5U, 5D. As a result, the reflection surfaces, which are optimal to form the light distribution in the oblique cutoff line CL1, i.e., the fourth and fifth segments 24 and 25, are provided in the range Z1 within the longitudinal angle of ±40 degrees from the center O1 of the light emitting chip 4, the range being equivalent to a range in which the reflection images I1, I2 of the light emitting chip 4 within an inclination angle (about 20 degrees) obtaining by adding about 5 degrees to an inclination angle (about 15 degrees) of the oblique cutoff line CL1, and in the range Z3 of high energy in the energy distribution (Lambertian) Z2 of the light emitting chip 4.

The first reflecting surface made of the fourth segment 24, as shown in FIGS. 20 and 22, is a reflecting surface made of a free curved face for light-distributing and controlling the reflection images I1, I2 of the light emitting chip 4 in a range Z4 in the light distribution pattern LP for low beam so that: the reflection images I1, I2 of the light emitting chip 4 are disallowed to come out of the oblique cutoff line CL1 and the horizontal cutoff line CL2; and a part of the reflection images I1, I2 of the light emitting chip 4 are substantially in contact with the oblique cutoff line CL1 and the horizontal cutoff line CL2.

In addition, the second reflecting surface made of the fifth segment 5, as shown in FIGS. 21 and 22, is a reflecting surface made of a free curved face for light-distributing and controlling the reflection images I1, I3 of the light emitting chip 4 in a range Z5 containing a range Z4 in the light distribution pattern LP for low beam, so that: the reflection images I1, I3 of the light emitting chip 4 are disallowed to come out of the oblique cutoff line CL1 and the horizontal cutoff line CL2 and a part of the reflection images I1, I3 of the light emitting chip 4 are substantially in contact with the oblique cutoff line CL1 and the horizontal cutoff line CL2; and further, the density of a group of the reflection images I1, I3 of the light emitting chip 4 becomes lower than that of a group of the reflection images I1, I2 of the light emitting chip 4 according to the first reflecting surface made of the fourth segment 24 and the group of the reflection images I1, I3 of the light emitting chip 4 contains that of the reflection images I1, I2 of the light emitting chip 4 according to the first reflecting surface made of the fourth segment 24. The density of a respective one of the reflecting surfaces I1, I2 of the light emitting chip 4 is equal or substantially equal to that of a respective one of the reflection images I1, I3 of the light emitting chip 4.

Further, the third reflecting surface made of the second segment 22, the third segment 23, the sixth segment 26, and the seventh segment 27, as shown in FIG. 22, are a reflecting surface made of a free curved face for light-distributing and controlling the reflection images I4, I5 of the light emitting chip 4 in a range Z6 containing the ranges Z4, Z5 in the light distribution pattern LP for low beam, so that: the reflection images I4, I5 of the light emitting chip 4 are substantially included in the light distribution pattern LP for low beam; the density of the group of the reflection images I4, I5 of the light emitting chip 4 becomes lower than that of a respective one of the group of the reflection images I1, I2 of the light emitting chip 4 according to the first reflecting surface made of the fourth segment 24 and the group of the reflecting surfaces I1, I3 of the light emitting chip 4 according to the second reflecting surface made of the fifth segment 25; and the group of the reflection images I4, I5 of the light emitting chip 4 contains that of the reflecting images I1, I2 of the light emitting chip 4 according to the first reflecting surface made of the fourth segment 24 and the group of the reflecting surfaces I1, I3 of the light emitting chip 4 according to the second reflecting surface made of the fifth segment 25.

The vehicle headlamp 1 of the embodiment is made up of the abovementioned constituent elements, and hereinafter, functions of these constituent elements will be described.

First, upside and downside movable reflectors 13U and 13D are positioned in a first location (the location in the state shown in FIGS. 1, 3, 5, and 9). In other words, if power supply to a motor 15 of a drive unit 14 is interrupted, the upside and downside movable reflectors 13U and 13D are positioned in the first location by means of a spring action and a stopper action, although not shown. At this time, a light emitting chip 4 of a respective one of the upside and downside semiconductor-type light sources 5U and 5D is lit to emit light. Afterward, the light is radiated from the light emitting chip 4 of the respective one of the upside and downside semiconductor-type light sources 5U and 5D.

A part of the abovementioned light, i.e., light L1 radiated on a first reflecting surface for high beam and daytime running light (a first segment 21 and an eighth segment 28) of a fixed reflector 3 is shaded by means of the upside and downside movable reflectors 13U and 13D, as shown in FIG. 5. In addition, a part of the abovementioned light, i.e., reflection light L2 reflected on a second reflecting surface for high beam and daytime running light (a ninth segment 29 and a tenth segment 20) of a fixed reflector 3 is shaded by means of the upside and downside movable reflectors 13U and 13D, as shown in FIG. 5. Further, remaining light L3, as shown in FIG. 5, is reflected on reflecting surfaces for low beam (a second segment 22, a third segment 23, a fourth segment 24, a fifth segment 25, a sixth segment 26, a seventh segment 27) of the upside and downside reflecting surfaces 2U and 2D of the fixed reflector 3. The reflection light L3 is illuminated toward the forward direction of the vehicle, as the light distribution pattern LP for low beam, shown in FIG. 22. The direct light (not shown) from the light emitting chip 4 of the respective one of the upside and downside semiconductor-type light sources 5U and 5D is shaded by means of the upside and downside movable reflectors 13U and 13D, in particular by means of a visor portion 18. In FIG. 5, an optical path in the downside reflecting surface 2D of the fixed reflector 3 and the downside reflecting surface 12D of the downside movable reflector 13D is not shown.

In other words, the reflected light from the first reflecting surface made of the fourth segment 24 of the reflecting surfaces 2U, 2D is controlled to be light-distributed in the range Z4 in the light distribution pattern LP for low beam, so that: reflection images I1, I2 of the light emitting chip 4 is disallowed to come out of an oblique cutoff line CL1 and a horizontal cutoff line CL2; and a part of the reflection mages I1, I2 of the light emitting chip 4 is substantially in contact with the oblique cutoff line CL1 and the horizontal cutoff line CL2.

In addition, the reflected light from the second reflecting surface made of the fifth segment 25 of the reflecting surfaces 2U, 2D is controlled to be light-distributed in a range Z5 containing the range Z4 in a light distribution pattern LP for low beam, so that: reflection images I1, I3 of the light emitting chip 4 is disallowed to come out of the oblique cutoff line CL1 and the horizontal cutoff line CL2 and a part of the reflection images I1, I3 of the light emitting chip 4 is substantially in contact with the oblique cutoff line CL1 and the horizontal cutoff line CL2; and the density of a group of the reflection images I1, I3 of the light emitting chip 4 becomes lower than that of a group of the reflection images I1, I2 of the light emitting chip 4 according to the first reflecting surface made of the fourth segment 24 and the group of the reflection images I1, I3 of the light emitting chip 4 contains that of the reflection images I1, I2 of the light emitting chip 4 according to the first reflecting surface made of the fourth segment 24.

Further, the reflected light from a third reflecting surface made of the second segment 22, the third segment 23, the sixth segment 26, and the seventh segment 27, of the reflecting surfaces 2U, 2D, is controlled to be light-distributed in a range Z6 containing the ranges Z4, Z5 in the light distribution pattern LP for low beam, so that: the reflection images I4, I5 of the light emitting chip 4 is substantially included in the light distribution pattern LP for low beam; the density of the group of the reflection images I4, I5 of the light emitting chip 4 becomes lower than that of the group of the reflection images I1, I2 of the light emitting chip 4 according to the first reflecting surface made of the fourth segment 24 and that of the group of the reflection images I1, I3 of the light emitting chip 4 according to the second reflecting surface made of the fifth segment 25; and the group of the reflection images I4, I5 of the light emitting chip 4 contains that of the group of the reflection images I1, I2 of the light emitting chip 4 according to the first reflecting surface made of the fourth segment 24 and that of the group of the reflection images I1, I3 of the light emitting chip 4 according to the second reflecting surface made of the fifth segment 25.

In such a manner as described above, the light distribution pattern LP for low beam, shown in FIG. 22, is illuminated toward the forward direction of the vehicle.

Next, the upside and downside movable reflectors 13U and 13D are positioned in a second location (the location in the state shown in FIGS. 2, 4, 6, and 10). In other words, if power is supplied to a motor 15 of the drive unit 14 via a control portion, thereby driving the motor 15, a drive force of the motor 15 is transmitted to the upside and downside movable reflectors 13U and 13D via a drive force transmission mechanism 16, and then, the upside and downside movable reflectors 13U and 13D synchronously rotate by 90 degrees from the first location to the second location in synchronism against a spring force, and are positioned in the second location. At this time, the light emitting chip 4 of the respective one of the upside and downside semiconductor-type light sources 5U and 5D are lit to emit light. Afterward, the light is radiated from the light emitting chip 4 of the respective one of the upside and downside semiconductor-type light sources 5U and 5D.

A part of the abovementioned light, i.e., a part of the light which is radiated on the reflecting surfaces for low beam (the second segment 22, the third segment 23, the fourth segment 24, the fifth segment 25, the sixth segment 26, the seventh segment 27) of the upside and downside reflecting surfaces 2U and 2D of the fixed reflector 3, is reflected on the third reflecting surfaces for high beam and daytime running light (the reflecting surfaces 12U, 12D), of the movable reflectors 13U, 13D, as shown in FIG. 6, and the reflected light L4 is illuminated toward the forward direction of the vehicle, as a third light distribution pattern HP3 for high beam, shown in FIG. 23. In addition, the remaining part of the light, which is radiated on the reflecting surfaces for low beam (the second segment 22, the third segment 23, the fourth segment 24, the fifth segment 25, the sixth segment 26, the seventh segment 27) of the upside and downside reflecting surfaces 2U and 2D of the fixed reflector 3, i.e., the remaining light that has not been incident to the third reflecting surfaces for high beam and daytime running light (the reflecting surfaces 12U, 12D) of the movable reflectors 13U, 13D, is reflected on the reflecting surfaces for low beam (the second segment 22, the third segment 23, the fourth segment 24, the fifth segment 25, the sixth segment 26, the seventh segment 27) of the fixed reflector 3; and the reflected light L3 is illuminated toward the forward direction of the vehicle, as a forth light distribution pattern HP4 for high beam, shown in FIG. 23. Furthermore, light L1 radiated on the first reflecting surface for high beam and daytime running light (the first and eighth segments 21 and 28), of the fixed reflector 3, which is shaded by means of the upside and downside movable reflectors 13U and 13D when the upside and downside movable reflectors 13U, 13D are positioned in the first location, is reflected on the first reflecting surface for high beam and daytime running light (the first and eighth segments 21 and 28), of the fixed reflector 3, as shown in FIG. 6, and the reflected light L5 is illuminated toward the forward direction of the vehicle, as the first light distribution pattern HP1 for high beam, shown in FIG. 23. Furthermore, reflected light L2 from the second reflecting surface for high beam and daytime running light (the ninth and tenth segments 29 and 20) of the fixed reflector 3, which is shaded by means of the upside and downside movable reflectors 13U and 13D when the upside and downside movable reflectors 13U, 13D are positioned in the first location, is illuminated to the forward direction of the vehicle, as the second light distribution pattern HP2 for high beam, shown in FIG. 23, via a through hole 17 of the respective one of the upside and downside movable reflectors 13U and 13D positioned in the second location, as shown in FIG. 6. In FIG. 6, an optical path in the downside reflecting surface 2D of the fixed reflector 3 and the downside reflecting surface 12D of the downside movable reflector 13D is not shown.

In such a manner as described above, light distribution patterns HP1, HP2, HP3, HP4 for high beam, shown in FIG. 23, are illuminated toward the forward direction of the vehicle.

Afterward, the upside and downside movable reflectors 13U and 13D are positioned in the third location (the location in the state shown in FIG. 7 or FIG. 8). In other words, if power is supplied to the motor 15 of the drive unit 14 via a control portion, thereby driving the motor 15, the drive force of the motor 15 is transmitted to the upside and downside movable reflectors 13U and 13D via the drive force transmission mechanism 16, and the upside and downside movable reflectors 13U and 13D synchronously rotate by 85 degrees or 105 degrees from the first location to the third location against the spring force, and is positioned in the third location. At this time, the light emitting chip 4 of the respective one of the upside and downside semiconductor-type light sources 5U and 5D is lit to emit light. Afterward, the light is radiated from the light emitting chip 4 of the respective one of the upside and downside semiconductor-type light sources 5U and 5D.

A part of the abovementioned light, i.e., a part of the light, which is radiated on the reflecting surfaces for low beam (the second segment 22, the third segment 23, the fourth segment 24, the fifth segment 25, the sixth segment 26, the seventh segment 27), of the upside and downside reflecting surfaces 2U and 2D of the fixed reflector 3, is reflected on the third reflecting surfaces for high beam and daytime running light (reflecting surfaces 12U, 12D), of the movable reflectors 13U, 13D, as shown in FIG. 7 or FIG. 8; and the reflected light L6 or L7 is illuminated toward the forward direction of the vehicle, as the first light distribution pattern DP1 for daytime running light and the second light distribution pattern DP2 for daytime running light, shown in FIG. 24. In addition, the remaining part of the light, which is radiated on the reflecting surfaces for low beam (the second segment 22, the third segment 23, the fourth segment 24, the fifth segment 25, the sixth segment 26, the seventh segment 27), of the upside and downside reflecting surfaces 2U and 2D of the fixed reflector 3, i.e., the remaining light that has not been incident to the third reflecting surfaces for high beam and daytime running light (the reflecting surfaces 12U, 12D), of the movable reflectors 13U, 13D, is reflected on the reflecting surfaces for low beam (the second segment 22, the third segment 23, the fourth segment 24, the fifth segment 25, the sixth segment 26, the seventh segment 27), of the upside and downside reflecting surfaces 2U and 2D of the fixed reflector 3; and the reflected light L3 is illuminated to the forward direction of the vehicle, as the fifth light distribution pattern DP5 for daytime running light, shown in FIG. 24. Further, the light L1 radiated on the first reflecting surface for high beam and daytime running light (the first and eighth segments 21 and 28), of the fixed reflector 3, which is shaded by means of the upside and downside movable reflectors 13U and 13D when the upside and downside movable reflectors 13U, 13D are positioned in the first location, is reflected on the first reflecting surface for high beam and daytime running light (the first and eighth segments 21 and 28) of the fixed reflector 3, as shown in FIG. 7 or FIG. 8, and the reflected light L5 is illuminated toward the forward direction of the vehicle, as the third light distribution pattern DP3 for daytime running light, shown in FIG. 24. Still furthermore, the reflected light L2 from the second reflecting surface for high beam and daytime running light (the ninth and tenth segments 29 and 20), which is shaded by means of the upside and downside movable reflectors 13U and 13D when the upside and downside movable reflectors 13U and 13D are positioned in the first location, is illuminated toward the forward direction of the vehicle, as the fourth light distribution pattern DP4 for daytime running light, shown in FIG. 24, via a through hole 17 of the respective one of the upside and downside movable reflectors 13U and 13D positioned in the third location, as shown in FIG. 7 or FIG. 8. In FIG. 7 or FIG. 8, an optical path in the downside reflecting surface 2D of the fixed reflector 3 and the downside reflecting surface 12D of the downside movable reflector 13D is not shown.

In such a manner as described above, the light distribution patterns DP1, DP2, DP3, DP4, DP5 for daytime running light, shown in FIG. 24, are illuminated toward the forward direction of the vehicle.

The vehicle headlamp 1 of the embodiment is made of the above-described constituent elements and functions, and hereinafter, advantageous effect thereof will be described.

According to the vehicle headlamp 1 of the embodiment, when the upside and downside movable reflectors 13U and 13D are positioned in the first location, if the light emitting chip 4 of the respective one of the upside and downside semiconductor-type light sources 5U and 5D is lit to emit light, the light which is radiated from the light emitting chip 4 is reflected on the reflecting surface for low beam (the second segment 22, the third segment 23, the fourth segment 24, the fifth segment 25, the sixth segment 26, the seventh segment 27) of the fixed reflector 3, and the reflected light L3 is then illuminated toward the forward direction of the vehicle, as the light distribution pattern LP for low beam. In addition, when the upside and downside movable reflectors 13U and 13D are positioned in the second location, if the light emitting chip 4 of the respective one of the upside and downside semiconductor-type light sources 5U and 5D is lit to emit light, the light which is radiated from the light emitting chip 4 is reflected on: the third reflecting surfaces 2U, 2D for high beam and daytime running light of the upside and downside movable reflectors 13U and 13D; and the first reflecting surface for high beam and daytime running light (the first and eighth segments 21 and 28), the second reflecting surface for high beam and daytime running light (the ninth and tenth segments 29 and 20), and the reflecting surface for low beam (the second segment 22, the third segment 23, the fourth segment 24, the fifth segment 25, the sixth segment 26, the seventh segment 27) of the fixed reflector 3, respectively; and the reflected light beams L2, L3, L4, L5 are then illuminated toward the forward direction of the vehicle, as the light distribution patterns HP1, HP2, HP3, HP4 for high beams, respectively. Further, when the upside and the downside movable reflectors 13U and 13D are positioned in the third location, if the light emitting chip 4 of the respective one of the upside and downside semiconductor-type light sources 5U and 5D is lit to emit light, the light which is radiated from the light emitting chip 4 is reflected on the third reflecting surfaces 2U, 2D for high beam and daytime running light of the downside movable reflectors 13U, 13D; and the first reflecting surface for high beam and daytime running light (the first and eighth segments 21 and 28), the second reflecting surface for high beam and daytime running light (the ninth and tenth segments 29 and 20), and the reflecting surface for low beam (the second segment 22, the third segment 23, the fourth segment 24, the fifth segment 25, the sixth segment 26, the seventh segment 27) of the fixed reflector 3, respectively; and the reflected light L2, L3, L5, L6, or L7 is illuminated toward the forward direction of the vehicle, as the light distribution pattern DP1, DP2, DP3, DP4, or DP5 for daytime running light, respectively.

Moreover, the vehicle headlamp 1 of the embodiment is made of: the fixed reflector 3; the upside and downside movable reflectors 13U and 13D; the upside and downside semiconductor-type light sources 5U and 5D; and the drive unit 14, so that: in comparison with the conventional vehicle headlamp, a need is eliminated for: a second light source unit for a light distribution pattern for high beam; and a third light unit for a light distribution pattern for daytime running light; the number of components is reduced; and downsizing, weight reduction, or cost reduction can be achieved accordingly.

In addition, according to the vehicle headlamp 1 of the embodiment, when the upside and downside movable reflectors 13U and 13D are positioned in the first location, a high luminous intensity zone Z4 is controlled to be light-distributed near the oblique cutoff line CL1 of the cruising lane side (left side) and the horizontal cutoff line CL2 of the opposite lane side (right side) of light distribution pattern LP for low beam, by means of the first reflecting surface (the fourth segment 24) of the fixed reflector 3, so that: long-distance visibility is improved and no stray light is imparted to an opposite vehicle or a pedestrian and the like, making it possible to contribute traffic safety as the result thereof. Moreover, according to the vehicle headlamp 1 of the embodiment, a middle luminous intensity zone Z5 which is controlled to be light-distributed on the second reflecting surface (the fifth segment 25) of the fixed reflector 3, includes the high luminous intensity zone Z4 near the oblique cutoff line CL1 of the cruising lane side (left side) of the light distribution pattern LP for low beam, which is controlled to be light-distributed on the first reflecting surface (the fourth segment 24), and the horizontal cutoff line CL2 of the opposite lane side (right side), so that: the high luminous intensity zone Z4 near the oblique cutoff line CL1 of the cruising lane side (left side) of the light distribution pattern LP for low beam, which is controlled to be light-distributed on the first reflecting surface (the fourth segment 24), and the horizontal cutoff line CL2 of the opposite lane side (right side), is connected to a low luminous intensity zone Z6 of the entire light distribution pattern LP for low beam, which is controlled to be light-distributed on the third reflecting surface (the second segment 22, the third segment 23, the sixth segment 26, the seventh segment 27) in the middle luminous intensity zone Z5 near the oblique cutoff line CL1 of the cruising lane side (left side) of the light distribution pattern LP for low beam, which is controlled to be light-distributed on the second reflecting surface (the fifth segment 25) and the horizontal cutoff line CL2 of the opposite lane side (right side). As a result, the vehicle headlamp 1 of the present invention becomes capable of light-distributing and controlling the light distribution pattern LP for low beam, having the oblique and horizontal cutoff lines CL1 and CL2, the light distribution pattern LP for low beam being optimal for use in vehicle.

In addition, according to the vehicle headlamp 1 of the embodiment, a relationship between the numbers of constituent light sources and optical elements is obtained as a relationship (1:1) between one set of the constituent light sources made of the upside and downside semiconductor-type light sources 5U and 5D and one set of the constituent optical elements made of the fixed reflector 3 and the upside and downside movable reflectors 13U and 13D. As a result, in comparison with the conventional vehicle headlamp in which a relationship between the numbers of constituent light sources and optical elements is obtained as a relationship (1:3) between one constituent light source and three constituent optical elements (a reflector, a shade, and a projecting lens) and that in which a relationship between the numbers of constituent light sources and optical elements is obtained as a relationship (1:2) between one constituent light source and two constituent optical elements (a reflector and a projecting lens), the vehicle headlamp 1 of the embodiment eliminates an error in combination of dispersions on the optical element side, making it possible to improve assembling precision of the fixed reflector 3 and the upside and downside movable reflectors 13U and 13D at the optical element side.

Further, according to the vehicle headlamp 1 of the embodiment, the fixed reflector 3 is substantially shaped like a rotational parabola face; the size of an opening of the fixed reflector 3 is about 120 mm or less in diameter and is greater than that of an opening of the respective one of the upside and downside movable reflectors 13U and 13D when they are positioned in the second location; a reference focal point F of the reflecting surfaces 2U, 2D of the fixed reflector 3 is on a reference optical axis Z and is positioned between the center O1 of the light emitting chip 4 and a long side at the backside of the light emitting chip 4; a reference focal point distance of the reflecting surfaces 2U, 2D of the fixed reflector 3 is about 10 to 18 mm and is greater than that of the respective one of the upside reflecting surface 12U of the upside movable reflector 13U and downside reflecting surface 12D of the downside movable reflector 13D; the first reflecting surface (the fourth segment 24) and the second reflecting surface (the fifth segment 25) are provided in a range in which a longitudinal angle from the center O1 of the light emitting chip 4 is within about ±40 degrees, the range being equivalent to a range in which a reflection image of which an inclination relative to the screen horizontal line HL-HR of the reflection image of the light emitting chip 4 is within an angle (about 20 degrees) obtained by adding about 5 degrees to an inclination angle (about 15 degrees) of the oblique cutoff line CL1 is obtained and in the range Z3 of high energy in the energy distribution Z2 of the light emitting chip 4. As a result, the vehicle headlamp 1 of the embodiment becomes capable of achieving both of light-distributing and controlling the light distribution pattern LP for low beam, which is optimal for use in vehicle, and downsizing lamp units.

Furthermore, according to the vehicle headlamp 1 of the embodiment, the reflecting surfaces 2U, 2D of the fixed reflector 3; the reflecting surfaces 12U, 12D of the movable reflectors 13U, 13D, and the semiconductor-type light sources 5U, 5D are disposed so that the upside units 2D, 5D, 12U, 13U, in which an light emission face of the light emitting chip 4 is oriented upward in the vertical-axis Y direction, becomes point-symmetrical to the downside units 2D, 5D, 12D, 13D, in which a light emission face of the light emitting chip 4 is oriented downward in the vertical-axis direction. As a result, according to the vehicle headlamp 1 of the embodiment, even if the fixed reflector 3 and the movable reflectors 13U and 13D are downsized, it is possible to sufficiently obtain luminous intensities of the light distribution pattern LP for low beam; the light distribution patterns HP1, HP2, HP3, HP4 for high beams; and the light distribution patterns DP1, DP2, DP3, DP4, DP5 for day time running light; and it is possible to further reliably achieve both of: light-distribute and control the light distribution pattern LP for low beam, the light distribution patterns HP1, HP2, HP3, HP4 for high beam, and the light distribution patterns DP1, DP2, DP3, D4, DP5 for daytime running light, which are optimal for use in vehicle; and downsizing lamp units.

Still furthermore, according to the vehicle headlamp 1 of the embodiment, the luminous quantities (luminous fluxes) of the light distribution patterns DP1, DP2, DP3, DP4, DP5 for daytime running light can be reduced with respect to the luminous quantities (luminous fluxes) of the light distribution pattern for low beam and the luminous quantities (luminous fluxes) of the light distribution patterns HP1, HP2, HP3, HP4 for high beams, so that: optimal light distribution patterns DP1, DP2, DP3, DP4,D5 for daytime running light are obtained; and power saving can be achieved.

Yet furthermore, according to the vehicle headlamp 1 of the embodiment, a rotational center X of the upside and downside movable reflectors 13U and 13D is positioned at or near the center O1 of the light emitting chip 4, thus simplifying a light distribution design or light distribution control of the upside and downside reflecting surfaces 12U and 12D when the upside and downside movable reflectors 13U and 13D are positioned in the second location.

The foregoing embodiments described a light distribution pattern LP for low beam. However, in the present invention, there may be a light distribution pattern having an oblique cutoff line on a cruising lane side and a horizontal cutoff line on an opposite lane side while an elbow point is employed as a boundary, such as a light distribution pattern for expressway or a light distribution pattern for fog lamp.

In addition, the foregoing embodiments described a vehicle headlamp 1 for left-side cruising lane. However, the present invention is applicable to a vehicle headlamp for right-side cruising lane as well.

Further, the foregoing embodiment described a vehicle headlamp 1 in which: the upside units made of the upside reflecting surfaces 2U, 12U and the upside semiconductor-type light source 5U; and the downside units made of the downside reflecting surfaces 2D, 12D and the downside units made of the downside reflecting surfaces 2D, 12D and the downside semiconductor-type light source 5D are disposed in a point-symmetrical state. However, in the present invention, there may be a vehicle headlamp made up of only the upside units made of the upside reflecting surfaces 2U, 12U and the upside semiconductor-type light source 5U or a vehicle headlamp made up of only the downside units of the downside reflecting surfaces 2D, 12D and the downside semiconductor-type light source 5D as well.

What is claimed is:

1. A vehicle headlamp, comprising:

(i) a fixed reflector having a reflecting surface made of a parabola-based free curved face;

(ii) a movable reflector having a reflecting surface made of a parabola-based free curved face;

(iii) a semiconductor-type light source having a light emitting chip;

(iv) a holder by which the movable reflector is rotatably mounted around a horizontal axis passing through a center of the light emitting chip or proximity thereof; and (v) a drive unit for rotating the movable reflector around the horizontal axis among a first location, a second location, and a third location, wherein:

a reference focal point of the reflecting surface of the fixed reflector and a reference focal point of the reflecting surface of the movable reflector are coincident or substantially coincident with each other and is positioned at the center of the light chip or proximity thereof;

a reference focal axis of the reflecting surface of the fixed reflector and a reference focal axis of the reflecting surface of the movable reflector are coincident or substantially coincident with each other and are orthogonal to the horizontal axis, and further pass through the center of the light emitting chip or proximity thereof;

an area of the reflecting surface of the fixed reflector is greater than an area of the reflecting surface of the movable reflector;

a reference focal point distance of the reflecting surface of the fixed reflector is greater than a reference focal point distance of the reflecting surface of the movable reflector;

the reflecting surface of the fixed reflector is comprised of:

a reflecting surface for low beam, forming a light distribution pattern for low beam; and a reflecting surface for high beam and daytime running light, forming a light distribution pattern for high beam or a light distribution pattern for daytime running light; the reflecting surface of the movable reflector is comprised of a reflecting surface for high beam and daytime running light, forming the light distribution pattern for high beam or the light distribution pattern for daytime running light;

when the movable reflector is positioned in the first location, light which is radiated from the light emitting chip, or reflection light reflected on the reflecting surface for high beam and daytime running light, of the fixed reflector, is shaded by means of the movable reflector, and reflection light reflected on the reflecting surface for low beam, of the fixed reflector, is illuminated toward a forward direction of a vehicle, as the light distribution pattern for low beam;

when the movable reflector is positioned in the second location, reflection light reflected on the reflecting surface for high beam and daytime running light, of the movable reflector; reflection light reflected on the reflecting surface for high beam and daytime running light, of the fixed reflector; and reflection light reflected on the reflecting surface for low beam, of the fixed reflector, respectively, are illuminated toward the forward direction of the vehicle, as the light distribution pattern for high beams; and when the movable reflector is positioned in the third location, reflection light which is reflected on the reflecting surface for high beam and daytime running light, of the movable reflector and then close-shifted or open-shifted; reflection light reflected on the reflecting surface for high beam and daytime running light, of the fixed reflector; and reflection light reflected on the reflecting surface for low beam, of the fixed reflector, respectively, are illuminated toward the forward direction of the vehicle, as the light distribution pattern for daytime running light.

2. The vehicle headlamp according to claim 1, wherein:

the light distribution pattern for low beam is a light distribution pattern having an oblique cutoff line on a cruising lane side and a horizontal cutoff line on an opposite lane side while an elbow point is employed as a boundary;

the light emitting chip is shaped like a planar rectangle;

a light emission face of the light emitting chip is oriented in a vertical-axis direction which is orthogonal to the reference optical axis and the horizontal axis;

a long side of the light emitting chip is parallel to the horizontal axis;

the reflecting surface for low beam is comprised of a first reflecting surface and a second reflecting surface, of a center portion, and a third reflecting surface of an end portion, which are divided into the vertical-axis direction;

the first reflecting surface is a reflecting surface made of a free curved face for light-distributing and controlling a reflection image of the light emitting chip so that: the reflection image of the light emitting chip is disallowed to come out of the oblique cutoff line and the horizontal cutoff line; and a part of the reflection image of the light emitting chip is substantially in contact with the oblique cutoff line and the horizontal cutoff line;

the second reflecting surface is a reflecting surface made of a free curved face for light-distributing and controlling the reflection image of the light emitting chip, so that: the reflection image of the light emitting chip is disallowed to come out of the oblique cutoff line and the horizontal cutoff line and a part of the reflection image of the light emitting chip is substantially in contact with the oblique cutoff line and the horizontal cutoff line; and density of a reflection image group of the light emitting chip becomes lower than density of a reflection image group of the light emitting chip according to the first reflecting surface and the reflection image group of the light emitting chip contains the reflection image group of the light emitting chip according to the first reflecting surface; and the third reflecting surface is a reflection surface made of a free curved face for light-distributing and controlling the light emitting chip, so that: the reflection image of the light emitting chip is substantially included in the light distribution pattern; the density of the reflection image group of the light emitting chip becomes lower than the density of the reflection image group of the light emitting chip according to the first reflecting surface and the second reflecting surface; and the reflection image group of the light emitting chip contains the reflection image group of the light emitting chip according to the first reflection surface and the second reflecting surface.

3. The vehicle headlamp according to claim 1, wherein:

the fixed reflector is substantially shaped like a rotational parabola face;

a size of an opening of the fixed reflector is about 120 mm or less in diameter, and is greater than a size of an opening of the movable reflector when the movable reflector is positioned in the second location and the third location;

a reference focal point of the reflecting surface of the fixed reflector is on the reference optical axis and is positioned between a center of the light emitting chip and a long side at a backside of the light emitting chip;

a reference focal point distance of the reflecting surface of the fixed reflector is about 10 to 18 mm, and is greater than a reference focal point distance of the reflecting surface of the movable reflector; and the first reflecting surface and the second reflecting surface are provided in a range in which a longitudinal angle from the center of the light emitting chip is within about ±40 degrees, the range being equivalent to a range in which a reflection image of which an inclination relative to the screen horizontal line of the reflection image of the light emitting chip is within an angle obtained by adding about 5 degrees to an inclination angle of the oblique cutoff line is obtained, and in a range of high energy in the energy distribution of the light emitting chip.

4. The vehicle headlamp according to claim 1, wherein:

the reflecting surface of the fixed reflector, the reflecting surface of the movable reflector, and the semiconductor-type light source are disposed so that an upside unit in which the light emission face of the light emitting chip is oriented upward in a vertical-axis direction is point-symmetrical to a downside unit in which the emission face of light emitting chip is oriented downward in the vertical-axis direction.

5. The vehicle headlamp according to claim 1, comprising a dimming control portion for dimming the light which is radiated from the light emitting chip of the semiconductor-type light source, when the movable reflector is positioned in the third location, with respect to the light which is radiated from the light emitting chip of the semiconductor-type light source when the movable reflector is positioned in the first location or the second location.

6. A vehicle headlamp, comprising:

(i) a semiconductor-type light source for illuminating light;

(ii) a first reflector of a parabola-based curved face, having a plurality of reflecting surfaces including a first reflecting surface for light distribution pattern and a second reflecting surface for light distribution pattern, for reflecting light which is radiated from the semiconductor-type light source as reflection light to thereby illuminate the reflected light to a forward direction of a vehicle;

(iii) a second reflector which is movable to a plurality of locations, having the second reflecting surface for light distribution pattern, the second reflector shading the reflected light according to the first reflecting surface for light distribution pattern and changing over a light distribution pattern according to the shaded reflecting surface;

(iv) a drive unit for moving the second reflector to the plurality of locations and changing over a first light distribution pattern, a second light distribution pattern, and a third light distribution pattern according to the moved position, wherein:

the second reflector is constituted to be movable between:

a first location in which the second reflecting surface for light distribution pattern, of the second reflector, is disposed opposing to the second reflecting surface for light distribution pattern, of the first reflector;

a second location in which the second reflecting surface for light distribution pattern, of the second reflector, is disposed in front of the first reflecting surface for light distribution pattern, of the first reflector;

a third location in which the second reflecting surface for light distribution pattern, of the second reflector, while the second reflector is inclined at a predetermined angle from the second location, is disposed in front of the first reflecting surface for light distribution pattern, of the first reflector;

when the second reflector is disposed in the first location, reflection light reflected on the second reflecting surface for light distribution pattern, of the first reflector, is shaded by means of the second reflecting surface for light distribution pattern, of the second reflector, and reflection light reflected on the first reflecting surface for light distribution pattern, of the first reflector, is illuminated toward the forward direction of the vehicle, as the first light distribution pattern;

when the second reflector is disposed in the second location, the reflection light reflected on the first reflecting surface for light distribution pattern, of the first reflector, is reflected by means of the second reflecting surface for light distribution pattern, of the second reflector, and a respective one of reflection light beams reflected on the second reflecting surface for light distribution pattern, of the first reflector, and on the second reflecting surface for light distribution pattern, of the second reflector, is illuminated to the forward direction of the vehicle, as the second light distribution pattern; and when the second reflector is disposed in the third location, the reflection light reflected on the first reflecting surface for light distribution pattern, of the first reflector, is reflected by the second reflecting surface for light distribution pattern, of the second reflector, while the second reflector is inclined at a predetermined angle from the second location, and a respective one of the reflection light beams reflected on the second reflecting surface for light distribution pattern, of the first reflector, and on the second reflecting surface for light distribution pattern, of the second reflector, while the second reflector is inclined at the predetermined angle from the second location, is illuminated toward the forward direction of the vehicle, as the third light distribution pattern.

7. The vehicle headlamp according to claim 6, further comprising a dimming control portion which is electrically connected to the semiconductor-type light source, for reducing a duty ratio of a pulse width supplied from a power source against time axis, thereby dimming a quantity of light which is radiated from the semiconductor-type light source, wherein:

the dimming control portion controls the semiconductor-type light source so that: a light quantity of the semiconductor-type light source when the second reflector is disposed in the third location is smaller than a light quantity of the semiconductor-type light source when the second reflector is positioned in the first location and the second location.

8. The vehicle headlamp according to claim 6, wherein:

the first reflecting surface for light distribution pattern, of the first reflector, is a reflecting surface forming reflection light of a light distribution pattern for low beam, having a cutoff line, which is the first light distribution pattern; and the second reflecting surface for light distribution pattern, of the first reflector, is a reflecting surface forming reflection light of a light distribution pattern for high beam, which is the second light distribution pattern or a light distribution pattern for daytime running light, which is the third light distribution pattern.

9. The vehicle headlamp according to claim 6, wherein:

the second location of the second reflector is determined by turning the second reflector at a first angle from the first location by means of the drive unit; and the third location of the second reflector is determined by turning the second reflector at an angle less than or more than the first angle from the first location.

10. The vehicle headlamp according to claim 6, wherein:

the second location of the second reflector is determined by turning the second reflector at 90 degrees from the first location by means of the drive unit; and the third location of the second reflector is determined by turning the second reflector at 85 degrees or 105 degrees from the first location by means of the drive unit.

11. The vehicle headlamp according to claim 6, wherein:

the second reflector has a through hole for passing the reflection light according to the second reflecting surface for light distribution pattern, of the first reflector, toward the forward direction of the vehicle, in the second location and the third location.

12. The vehicle headlamp according to claim 6, wherein:

the second reflector has a visor portion which is provided at a peripheral rim of the second reflector so as to shade direct light from the semiconductor-type light source in the first location.

13. The vehicle headlamp according to claim 6, wherein:
the second reflecting surface for light distribution pattern, of the second reflector, is disposed opposing to a part of the first reflecting surface for light distribution pattern, of the first reflector, in the second location and the third location;
when the second reflector is disposed in the second location and the third location, a part of the reflection light reflected on the first reflecting surface of the first reflector is reflected by means of the second reflecting surface for light distribution pattern, of the first reflector; and
a respective one of reflection light beams reflected on: the second reflecting surface for light distribution pattern, of the first reflector; the second reflecting surface for light distribution pattern, of the second reflector; and a portion other than said part of the first reflecting surface for light distribution pattern, of the first reflector, is illuminated toward the forward direction of the vehicle.

14. The vehicle headlamp according to claim 6, further comprising a holder for fixing and holding the semiconductor-type light source and the first reflector so as to reflect the light which is radiated from the light emission face of the semiconductor-type light source in a vertical-axis direction by the first reflector, as reflection light, and illuminate the reflected light toward the forward direction of the vehicle, wherein:
the holder is adapted to rotatably mount the second reflector among the first location, the second location, and the third location, according to changeover by the drive unit.

15. The vehicle headlamp according to claim 6, wherein:
the first reflecting surface for light distribution pattern, of the first reflector, includes:
a fourth reflecting surface and a fifth reflecting surface which are adjacent to a center of the first reflector and arranged in a range of high energy in an energy distribution of the semiconductor-type light source; and
a sixth surface which is arranged on each end of the first reflector so as to sandwich the fourth reflecting surface and the fifth reflecting surface therebetween, and is arranged in a range of low energy in the energy distribution of the semiconductor-type light source; and
the second reflecting surface for light distribution pattern, of the first reflector, is provided at a part of the fourth reflecting surface and the fifth reflecting surface.

16. The vehicle headlamp according to claim 15, wherein:
the fourth reflecting surface and the fifth reflecting surface are provided in a range in which a reflection image of the semiconductor-type light source is obtained within a longitudinal angle of about ±40 degrees from a center in a vertical-axis direction of the light emission face of the semiconductor-type light source.

17. The vehicle headlamp according to claim 6, wherein:
the light distribution pattern for low beam, which is the first light distribution pattern, is a light distribution pattern having an oblique cutoff line on a cruising lane side and a horizontal cutoff line on an opposite lane side while an elbow point is employed as a boundary;
the semiconductor-type light source has a light emitting chip;
the light emitting chip is shaped like a planar rectangle;
a light emission face of the light emitting chip is oriented in a vertical-axis direction which is orthogonal to the reference optical axis and the horizontal axis;
a long side of the light emitting chip is parallel to the horizontal axis;
the reflecting surface for low beam which is the first reflecting surface for light distribution pattern is comprised of a first reflecting surface and a second reflecting surface, of a center portion, and a third reflecting surface of an end portion, which are divided into the vertical-axis direction;
the first reflecting surface is a reflecting surface made of a free curved face for light-distributing and controlling a reflection image of the light emitting chip so that: the reflection image of the light emitting chip is disallowed to come out of the oblique cutoff line and the horizontal cutoff line; and a part of the reflection image of the light emitting chip is substantially in contact with the oblique cutoff line and the horizontal cutoff line; and
the second reflecting surface is a reflecting surface made of a free curved face for light-distributing and controlling the reflection image of the light emitting chip, so that: the reflection image of the light emitting chip is disallowed to come out of the oblique cutoff line and the horizontal cutoff line and a part of the reflection image of the light emitting chip is substantially in contact with the oblique cutoff line and the horizontal cutoff line; and density of a reflection image group of the light emitting chip becomes lower than density of a reflection image group of the light emitting chip according to the first reflecting surface and the reflection image group of the light emitting chip contains the reflection image group of the light emitting chip according to the first reflecting surface; and
the third reflecting surface is a reflection surface made of a free curved face for light-distributing and controlling the light emitting chip, so that: the reflection image of the light emitting chip is substantially included in the light distribution pattern; the density of the reflection image group of the light emitting chip becomes lower than the density of the reflection image group of the light emitting chip according to the first reflecting surface and the second reflecting surface; and the reflection image group of the light emitting chip contains the reflection image group of the light emitting chip according to the first reflecting surface and the second reflecting surface.

18. The vehicle headlamp according to claim 6, wherein:
the first reflector is substantially shaped like a rotational parabola face;
a size of an opening of the first reflector is about 120 mm or less in diameter, and is greater than a size of an opening of the second reflector when the second reflector is positioned in the second location and the third location;
a reference focal point of the reflecting surface of the first reflector is on the reference optical axis and is positioned between a center of the light emitting chip and a long side at a backside of the light emitting chip;
a reference focal point distance of the reflecting surface of the first reflector is about 10 to 18 mm, and is greater than a reference focal point distance of the reflecting surface of the second reflector; and
the first reflecting surface and the second reflecting surface are provided in a range in which a longitudinal angle from the center of the light emitting chip is within about ±40 degrees, the range being equivalent to a range in which a reflection image of which an inclination relative to the screen horizontal line of the reflection image of the light emitting chip is within an angle obtained by adding about 5 degrees to an inclination angle of the oblique cutoff line is obtained, and in a range of high energy in the energy distribution of the light emitting chip.

19. The vehicle headlamp according to claim 16, wherein: the reflecting surface of the first reflector, the reflecting surface of the second reflector, and the semiconductor-type light source are disposed so that an upside unit having the light emission face of the light emitting chip oriented upward in a vertical-axis direction is point-symmetrical to a downside unit having the emission face of light emitting chip oriented downward in the vertical-axis direction.

* * * * *